US012631273B2

(12) United States Patent
Boone et al.

(10) Patent No.: US 12,631,273 B2
(45) Date of Patent: May 19, 2026

(54) PIPE FITTING WITH DRAW MECHANISM

(71) Applicant: ROMAC INDUSTRIES, INC.,
Bothell, WA (US)

(72) Inventors: Caitlin Marie Boone, Mountlake
Terrace, WA (US); **David Richard
Albin**, Bothell, WA (US)

(73) Assignee: Romac Industries, Inc., Bothell, WA
(US)

( * ) Notice: Subject to any disclaimer, the term of this
patent is extended or adjusted under 35
U.S.C. 154(b) by 0 days.

(21) Appl. No.: 18/690,677

(22) PCT Filed: Sep. 17, 2021

(86) PCT No.: PCT/US2021/050830
§ 371 (c)(1),
(2) Date: Mar. 8, 2024

(87) PCT Pub. No.: WO2023/038646
PCT Pub. Date: Mar. 16, 2023

(65) Prior Publication Data
US 2024/0377004 A1     Nov. 14, 2024

Related U.S. Application Data

(60) Provisional application No. 63/242,336, filed on Sep.
9, 2021.

(51) Int. Cl.
F16L 21/00     (2006.01)
F16L 21/04     (2006.01)

(52) U.S. Cl.
CPC ........... F16L 21/007 (2013.01); F16L 21/045
(2013.01)

(58) Field of Classification Search
CPC ....... F16L 21/007; F16L 21/045; F16L 21/03;
F16L 21/04; F16L 21/06; F16L 21/065
(Continued)

(56) References Cited

U.S. PATENT DOCUMENTS 1,622,768 A * 3/1927 Cook ...................... F16L 21/04
285/356
3,761,114 A     9/1973 Blakeley
(Continued)

*Primary Examiner* — David Bochna
(74) *Attorney, Agent, or Firm* — Seed Intellectual
Property Law Group LLP

(57) ABSTRACT

A fitting includes a hollow main body including a flange that
extends radially outward with respect to a central longitu-
dinal axis of the hollow main body and that extends cir-
cumferentially 360 degrees around the central longitudinal
axis of the hollow main body, a gasket having a cross-
sectional shape comprising a pentagon, the gasket posi-
tioned on an interior surface of the hollow main body, an end
ring coupled to an exterior surface of the hollow main body,
the end ring including a flange that extends longitudinally
with respect to the central longitudinal axis of the hollow
main body, wherein the exterior surface extends at an
oblique angle with respect to the interior surface, and a
plurality of hooks each coupled to the gasket and to the end
ring such that rotation of the end ring with respect to the
hollow main body about the central longitudinal axis of the
hollow main body draws the gasket axially with respect to
the central longitudinal axis of the hollow main body and
radially inward with respect to the central longitudinal axis
of the hollow main body, thereby forcing the gasket into a
sealing configuration.

17 Claims, 17 Drawing Sheets

FIG. 20

(58) Field of Classification Search
USPC ................................................ 285/343, 342
See application file for complete search history.

(56) References Cited

U.S. PATENT DOCUMENTS

| | | | | |
|---|---|---|---|---|
| 4,480,861 A | | 11/1984 | Cann, Jr. | |
| 4,753,461 A | * | 6/1988 | Miller | F16L 21/007 |
| | | | | 285/341 |
| 4,878,698 A | * | 11/1989 | Gilchrist | F16L 21/08 |
| | | | | 285/342 |
| 5,803,513 A | * | 9/1998 | Richardson | F16L 21/08 |
| | | | | 285/342 |
| 5,992,905 A | * | 11/1999 | Kennedy, Jr. | F16L 21/08 |
| | | | | 285/337 |
| 8,894,100 B2 | | 11/2014 | Eaton et al. | |
| 9,303,803 B2 | * | 4/2016 | Gifford | F16L 21/08 |
| 9,534,714 B2 | | 1/2017 | Eaton et al. | |
| 9,915,385 B2 | | 3/2018 | Eaton et al. | |
| 2013/0241198 A1 | | 9/2013 | Eaton et al. | |

* cited by examiner

144

*150*

*146*

*148*

PIPE FITTING WITH DRAW MECHANISM

BACKGROUND

Technical Field

The present disclosure relates generally to pipe fittings, and more particularly to pipe fittings including draw mechanisms that facilitate securing the pipe fittings to ends of pipes.

Description of the Related Art

A wide variety of pipe fittings are currently available in the market. Nevertheless, there is room for improvement in existing fittings, including with respect to the cost efficiency, strength and other capabilities, as well as usability of such fittings. Examples of pipe fittings are provided in U.S. Pat. No. 8,894,100, issued Nov. 25, 2014, 9,534,714, issued Jan. 3, 2017, and U.S. Pat. No. 9,915,385, issued Mar. 13, 2018, which are hereby incorporated herein by reference, in their entireties.

BRIEF SUMMARY

A fitting may be summarized as comprising: a hollow main body including a flange that extends radially outward with respect to a central longitudinal axis of the hollow main body and that extends circumferentially around the central longitudinal axis of the hollow main body; a seal assembly positioned on an interior surface of the hollow main body; and an actuation mechanism coupled to the seal assembly such that actuation of the actuation mechanism draws the seal assembly axially with respect to the central longitudinal axis of the hollow main body and radially inward with respect to the central longitudinal axis of the hollow main body, thereby forcing the seal assembly into a sealing configuration; wherein the interior surface of the hollow main body includes a lip that prevents movement of the seal assembly longitudinally outward along the central longitudinal axis of the hollow main body beyond a longitudinal location of the flange along the central longitudinal axis of the hollow main body.

When the seal assembly reaches the end of its travel toward a terminal end portion of the hollow main body, at least a portion of the seal assembly may be directly radially inward of the flange. The lip may be segmented and may be a longitudinally inward-facing surface. The hollow main body may be a pipe coupling, a pipe endcap, a flanged coupling adapter, an elbow, a tee, a valve, or a hydrant.

A fitting may be summarized as comprising: a hollow main body; a seal positioned on an interior surface of the hollow main body; and an end ring coupled to an exterior surface of the hollow main body, the end ring including a flange that extends outward from a radially-outermost end portion of the end ring and longitudinally with respect to a central longitudinal axis of the hollow main body; wherein rotation of the end ring with respect to the hollow main body about the central longitudinal axis of the hollow main body draws the seal axially with respect to the central longitudinal axis of the hollow main body and radially inward with respect to the central longitudinal axis of the hollow main body, thereby forcing the seal into a sealing configuration.

The flange may have a variable cross-section along a length of the flange. The extension of the flange around the central longitudinal axis of the hollow main body may be interrupted. The flange may be a first flange and the hollow main body may include a second flange that extends radially outward with respect to the central longitudinal axis of the hollow main body and that extends circumferentially around the central longitudinal axis of the hollow main body. A radially-innermost surface of the first flange may face and may be adjacent to a radially-outermost surface of the second flange. The hollow main body may be a pipe coupling, a pipe endcap, a flanged coupling adapter, an elbow, a tee, a valve, or a hydrant.

A fitting may be summarized as comprising: a hollow main body; a gasket positioned on an interior surface of the hollow main body, the gasket having a length aligned with a central longitudinal axis of the hollow main body and a cross-sectional shape configured such that the gasket engages with the interior surface of the hollow main body along a distance less than the length of the gasket; and an actuation mechanism coupled to the gasket such that actuation of the actuation mechanism draws the gasket axially with respect to the central longitudinal axis of the hollow main body and radially inward with respect to the central longitudinal axis of the hollow main body, thereby forcing the gasket into a sealing configuration. The cross-sectional shape of the gasket may be configured such that the gasket engages with the interior surface of the hollow main body along half the length of the gasket. The cross-sectional shape of the gasket may be configured such that a longitudinally-outermost portion of the gasket engages with the interior surface of the hollow main body and a longitudinally-innermost portion of the gasket does not engage with the interior surface of the hollow main body. The gasket may engage with the interior surface of the hollow main body along a partial portion of its radially-outermost surfaces. The gasket may engage with the interior surface of the hollow main body along less than a length of a radial projection of the gasket onto the interior surface of the hollow main body.

The cross-sectional shape of the gasket may include: a first, radially inner-most side that extends parallel to the central longitudinal axis of the hollow main body; a second, longitudinally-outward facing side that extends perpendicular to the first side; a third, longitudinally-inward facing side that extends perpendicular to the first side; a fourth side that extends from the second side to a location midway between a plane of the second side and a plane of the third side, wherein a first angle between the fourth side and the second side is greater than ninety degrees; and a fifth side that extends from the third side to meet the fourth side at the location midway between the plane of the second side and the plane of the third side, wherein a second angle between the fifth side and the third side is greater than ninety degrees. The third side may be shorter than the second side and the fifth side may be longer than the fourth side.

The gasket may have a radially-innermost and radially-inward facing surface and ribs on the radially-inward facing surface. The hollow main body may be a pipe coupling, a pipe endcap, a flanged coupling adapter, an elbow, a tee, a valve, or a hydrant.

A fitting may be summarized as comprising: a hollow main body; a seal positioned on an interior surface of the hollow main body; and an actuation mechanism coupled to an exterior surface of the hollow main body, wherein the exterior surface extends at an oblique angle with respect to the interior surface; wherein actuation of the actuation mechanism draws the seal axially with respect to the central longitudinal axis of the hollow main body and radially inward with respect to the central longitudinal axis of the hollow main body, thereby forcing the seal into a sealing configuration.

The oblique angle may be at least 5 degrees. The oblique angle may be less than 40 degrees. The hollow main body may be a pipe coupling, a pipe endcap, a flanged coupling adapter, an elbow, a tee, a valve, or a hydrant. The actuation mechanism may include a plurality of hooks and actuation of the actuation mechanism causes the hooks to rotate with respect to the hollow main body.

A fitting may be summarized as comprising: a hollow body having an opening at a first end of the hollow body, wherein the first end of the hollow body includes a plurality of circumferentially-spaced tapered tabs that converge towards a central longitudinal axis of the hollow body, adjacent ones of the tabs being separated in a circumferential direction by longitudinally extending slots, wherein the hollow body includes a first flange that extends radially outward with respect to the central longitudinal axis of the hollow body and that extends circumferentially 360 degrees around the central longitudinal axis of the hollow body; a seal positioned on an interior surface of the hollow body, the seal having a length aligned with the central longitudinal axis of the hollow body and a cross-sectional shape configured such that the seal engages with the interior surface of the hollow body along a distance less than the length of the seal; a draw mechanism including: a primary actuation element rotatably coupled with an exterior surface of the first end of the hollow body, the primary actuation element extending around the opening at the first end of the hollow body and including a plurality of sloped surfaces, the primary actuation element including a second flange that extends outward from a radially-outermost end portion of the primary actuation element and longitudinally with respect to the central longitudinal axis of the hollow body, wherein the exterior surface extends at an oblique angle with respect to the interior surface; and a plurality of secondary actuation elements coupled to the seal, the plurality of secondary actuation elements positioned in an interior of the hollow body, the plurality of secondary actuation elements spaced apart from one another about the opening at the first end of the hollow body, each of the secondary actuation elements extending through a respective one of the longitudinally extending slots, each of the secondary actuation elements engaged with a respective one of the plurality of sloped surfaces of the primary actuation element, the plurality of secondary actuation elements engaged with the primary actuation element such that rotation of the primary actuation element in the circumferential direction with respect to the central longitudinal axis of the hollow body draws the plurality of secondary actuation elements axially towards the opening at the first end of the hollow body and radially inward toward the central longitudinal axis of the hollow body, thereby dragging the seal from an open position to a sealing position; a plurality of gripping elements, each of the gripping elements coupled to one of the secondary actuation elements such that the gripping element is moved axially towards the opening at the first end of the hollow body and radially inward towards the central longitudinal axis of the hollow body from an open position to an engaged position by rotation of the primary actuation element in the circumferential direction with respect to the central longitudinal axis of the hollow body, wherein the interior surface of the hollow body includes a lip that prevents movement of the gripping elements longitudinally outward along the central longitudinal axis of the hollow body beyond a longitudinal location of the first flange along the central longitudinal axis of the hollow body; and a bolt that extends substantially transverse to the central longitudinal axis of the hollow body and from a first lug that extends from the hollow body to a second lug that extends from the primary actuation element, wherein the first and second lugs are positioned such that actuating the bolt causes the primary actuation element to rotate in the circumferential direction with respect to the central longitudinal axis of the hollow body.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with the technology have not been shown or described in detail to avoid unnecessarily obscuring descriptions of the implementations.

Figure 1:
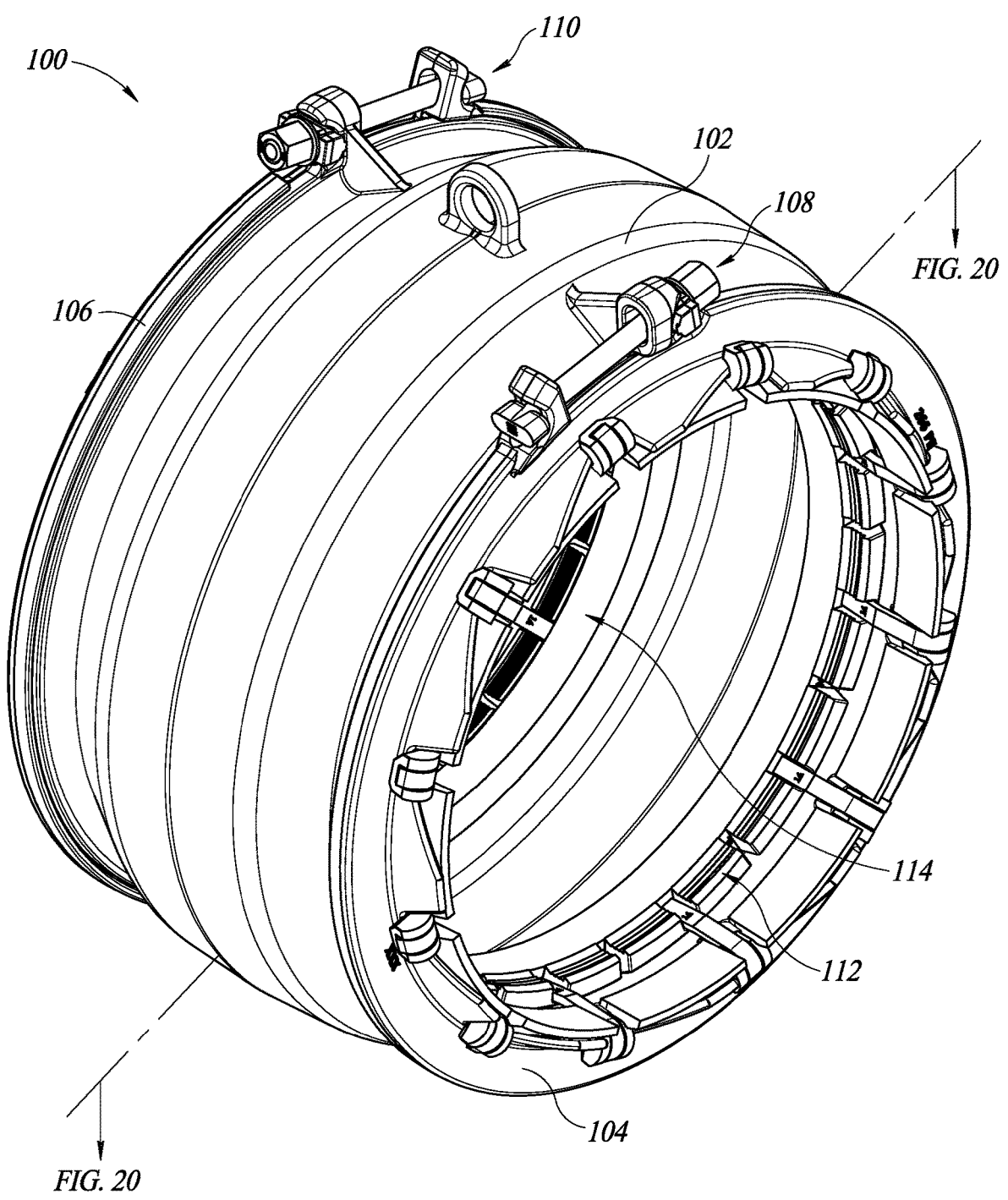
FIG. 1 illustrates a perspective view of a pipe fitting.

FIG. 1 illustrates a pipe fitting 100. As illustrated in FIG. 1, the pipe fitting 100 includes a main body, housing, or barrel sleeve 102, a first end ring 104 mounted to a first end of the main body 102, and a second end ring 106 mounted to a second end of the main body 102 opposite the first end of the main body 102. The main body 102, the first end ring 104, and the second end ring 106 each have an overall generally hollow cylindrical shape. The pipe fitting 100 has an overall generally hollow cylindrical shape having a central longitudinal axis that is coincident with central longitudinal axes of the main body 102, the first end ring 104, and the second end ring 106. Further, the pipe fitting 100 is generally symmetrical about a plane perpendicular to its central longitudinal axis that extends through a center of the pipe fitting 100, or about an axis within such a plane, such that the pipe fitting 100 looks identical whether viewed in a first direction along its central longitudinal axis, or in a second direction opposite to the first direction along its central longitudinal axis. Thus, while the present disclosure focuses on the features and functionality of the pipe fitting 100 at the first end thereof, the description herein applies equally to the features and functionality of the pipe fitting 100 at the second end thereof.

The pipe fitting 100 also includes a first bolt assembly 108 mounted to the first end of the main body 102 and to the first end ring 104, and a second bolt assembly 110 mounted to the second end of the main body 102 and to the second end ring 106, as well as a first seal assembly 112 mounted to the first end of the main body 102 and to the first end ring 104, and a second seal assembly 114 mounted to the second end of the main body 102 and to the second end ring 106. The end rings 104, 106 are rotatably mounted to the respective ends of the main body 102, such that the first and second end rings 104, 106 can rotate with respect to the main body 102 about the central longitudinal axis of the pipe fitting 100.

For example, threading a nut of one of the bolt assemblies 108, 110 onto a threaded bolt of the bolt assembly 108 or 110 (that is, tightening the nut) can force the respective end ring 104, 106 to rotate in a first direction with respect to the main body 102 about the central longitudinal axis of the pipe fitting 100, e.g., to tighten or close the pipe fitting 100 at the respective end thereof. In some embodiments, this tightening of the nut can force the respective seal assembly 112, 114 to move longitudinally outward along the central longitudinal axis of the pipe fitting 100, and radially inward with respect to the central longitudinal axis of the pipe fitting 100 until the seal assembly 112, 114 engages with an outer surface of a pipe 300 (see FIG. 20) to which the pipe fitting 100 is being coupled, thereby resulting in the tightening and closing of the pipe fitting 100 about the end of the pipe 300.

Further, threading a nut of one of the bolt assemblies 108, 110 off of a threaded bolt of the bolt assembly 108 or 110 (that is, loosening the nut) can allow the respective end ring 104, 106 to rotate in a second direction opposite the first with respect to the main body 102 about the central longitudinal axis of the pipe fitting 100, e.g., to loosen or open the pipe fitting 100 at the respective end thereof. In some embodiments, this loosening of the nut can allow the respective seal assembly 112, 114 to move longitudinally inward along the central longitudinal axis of the pipe fitting 100, and radially outward with respect to the central longitudinal axis of the pipe fitting 100 until the seal assembly 112, 114 no longer engages with the outer surface of the pipe 300 to which the pipe fitting 100 was coupled, thereby resulting in the loosening and opening of the pipe fitting 100 about the end of the pipe 300.

Figure 2:
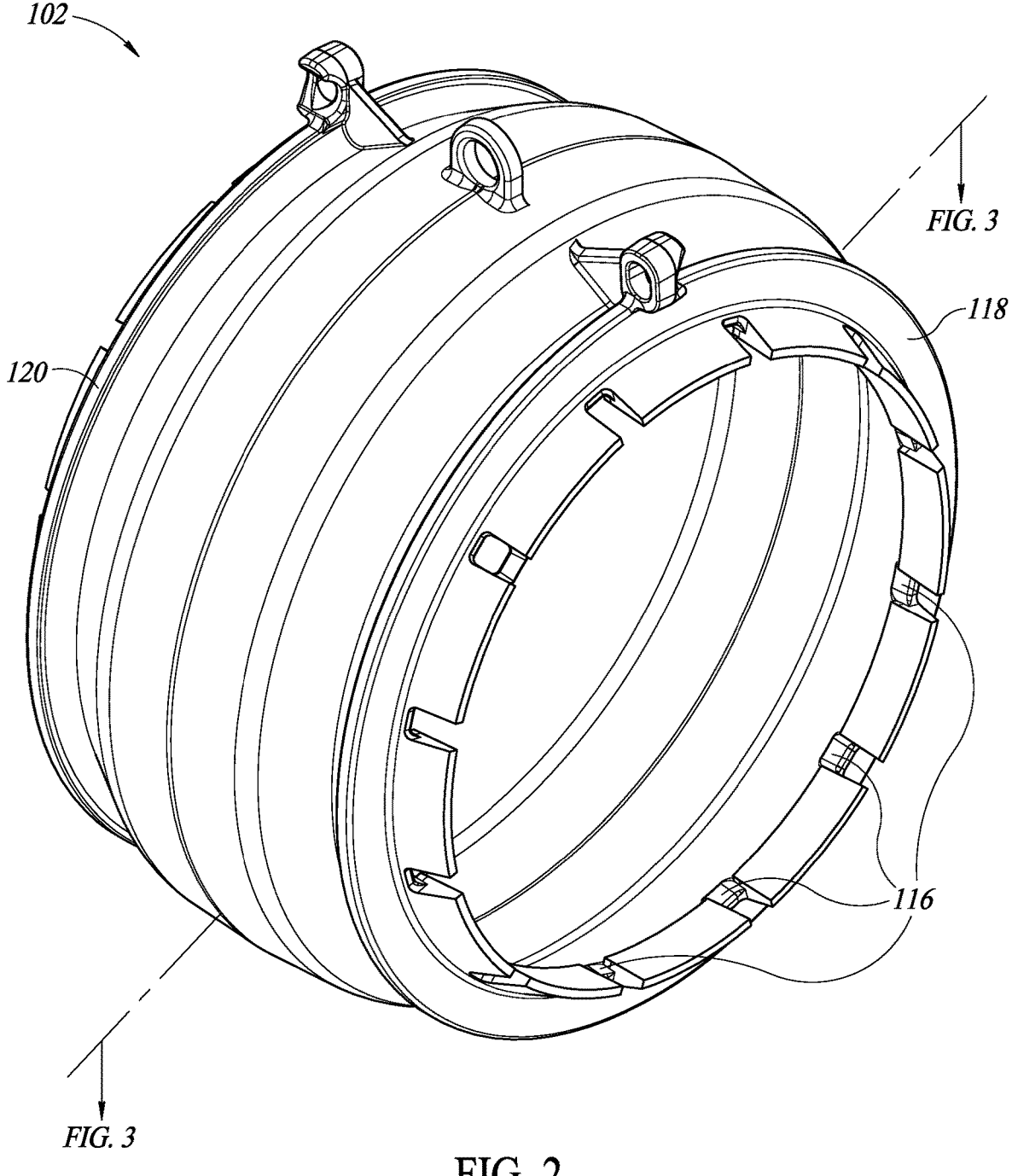
FIG. 2 illustrates a perspective view of a main body of the pipe fitting of FIG. 1.

FIG. 2 illustrates the main body 102 of the pipe fitting 100 by itself. As illustrated in FIG. 2, the main body 102 of the pipe fitting 100 includes a plurality of slots or notches 116 formed in either end thereof. For example, at the first end of the pipe fitting 100, the main body 102 includes twelve notches 116 that extend longitudinally into the terminal end portion of the main body 102. As also illustrated in FIG. 2, the main body 102 includes a respective circumferential flange that extends radially outward from an outer surface of the main body 102 at either end thereof. For example, the main body 102 includes a first circumferential flange 118 at a first end portion thereof and a second circumferential flange 120 at a second end portion thereof. As illustrated in FIG. 2, each of the circumferential flanges 118, 120 extends a full 360 degrees around the central longitudinal axis of the pipe fitting 100. Each of the circumferential flanges 118, 120 has a generally annular shape having a central longitudinal axis that is coincident with the central longitudinal axis of the pipe fitting 100. That is, the circumferential flanges 118, 120 extend radially outward from the outer surface of the main body 102 of the pipe fitting 100 at every location around the circumference of the main body 102. Put another way, each of the circumferential flanges 118, 120 extends, uninterrupted, about the entirety of the outer surface of the main body 102 of the pipe fitting 100.

Figure 3:
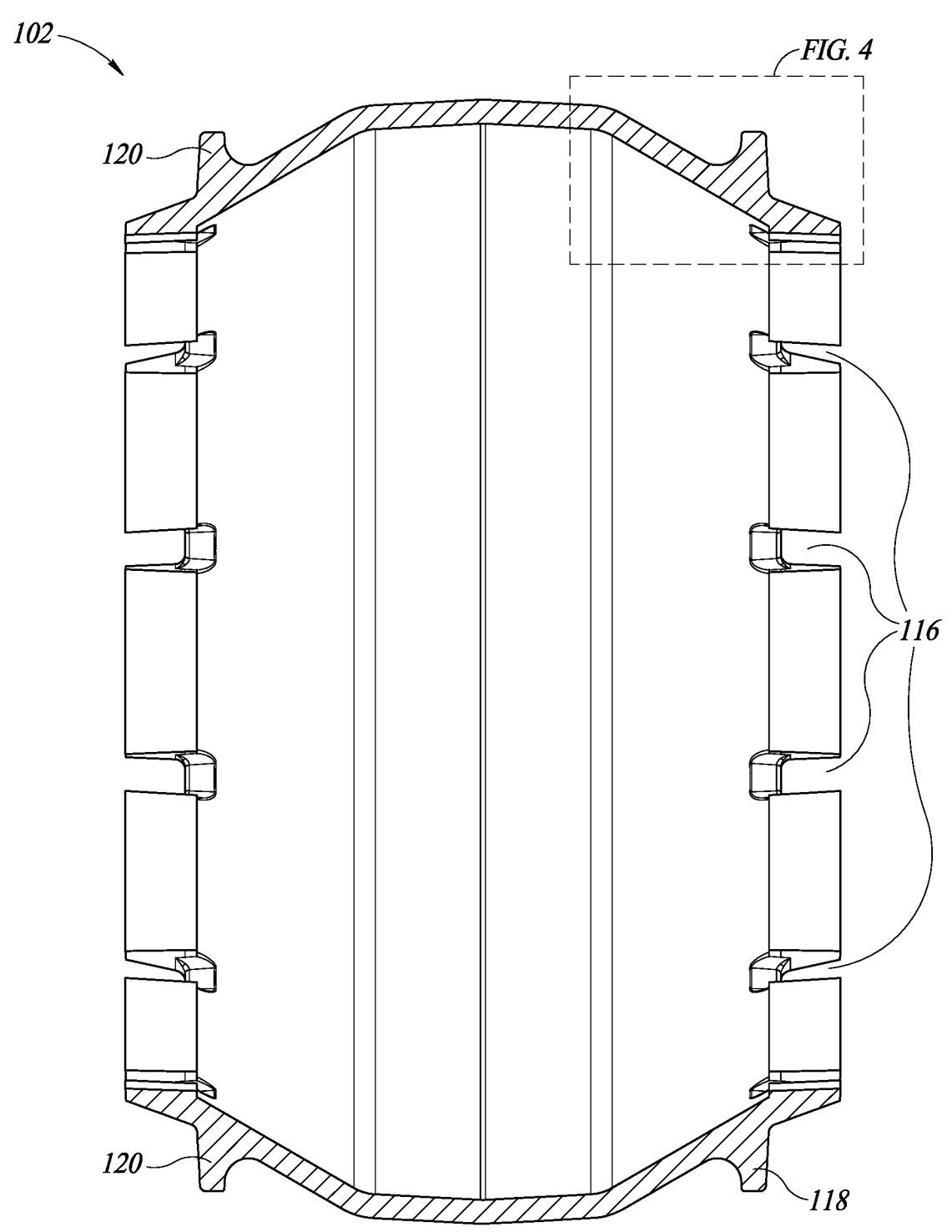
FIG. 3 illustrates a cross-sectional view of the main body of FIG. 2 taken along line 3-3 illustrated in FIG. 2.
Figures 4, 5:
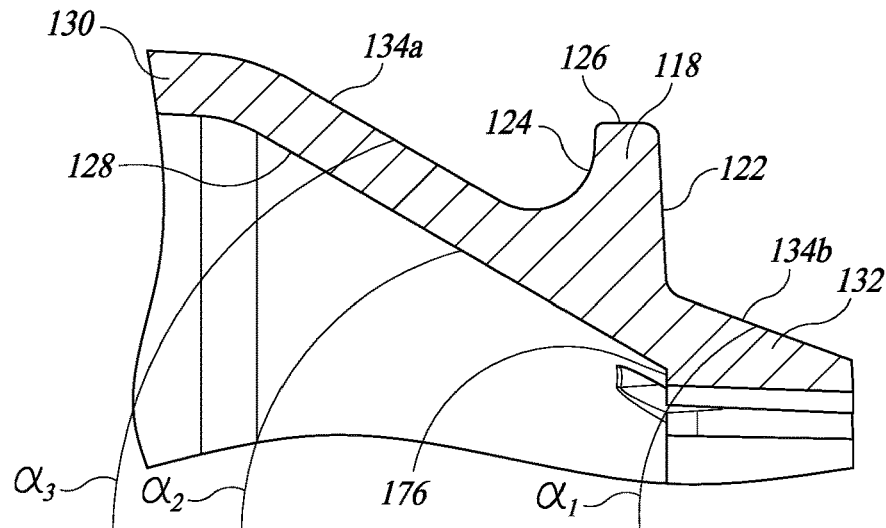
FIG. 4 illustrates an enlarged view of a portion of FIG. 3.
FIG. 5 illustrates a perspective view of an end ring of the pipe fitting of FIG. 1.

FIG. 3 illustrates a cross-sectional view of the main body 102, including the notches 116 and the flanges 118, 120. FIG. 3 illustrates, among other things, symmetries of the main body 102. FIG. 4 illustrates an enlarged view of a portion of FIG. 3. Specifically, FIG. 4 illustrates a cross-sectional view of a terminal end portion of the main body 102 of the pipe fitting 100. FIG. 4 illustrates some geometric details of the circumferential flange 118 in greater detail. For example, FIG. 4 illustrates that the circumferential flange 118 extends directly radially outward from an outer surface of the main body 102 with respect to a central longitudinal axis of the pipe fitting 100.

A longitudinally-outward facing surface 122 of the circumferential flange 118 is substantially planar along its length from a radially-outermost end portion of the circumferential flange 118 to the outer surface of the main body 102. In some embodiments, a radial length of the longitudinally-outward facing surface 122, from the radially-outermost end portion of the circumferential flange 118 to the outer surface of the main body 102, can be equal to or approximately equal to a longitudinal distance from the longitudinally-outward facing surface 122 to a terminal end of the main body 102. A longitudinally-inward facing surface 124 of the circumferential flange 118, opposite to the longitudinally-outward facing surface 122 thereof, is substantially curved from the radially-outermost end portion of the circumferential flange 118 to the outer surface of the main body 102. A radially-outermost end surface 126 of the circumferential flange 118 can be planar, parallel to the central longitudinal axis of the pipe fitting 100, and perpendicular to both the longitudinally-outward facing surface 122 of the circumferential flange 118 and the longitudinally-inward facing surface 124 of the circumferential flange 118 where the longitudinally-inward facing surface 124 meets the radially-outermost end surface 126 of the circumferential flange 118.

In some implementations, fabricating the main body 102, including the circumferential flange 118, can include casting the main body 102, including the circumferential flange 118, as a single component. In other implementations, fabricating the main body 102, including the circumferential flange 118, can include casting the main body 102 without the circumferential flange 118 and then welding the circumferential flange 118 onto the main body 102. In such implementations, the material from which the circumferential flange 118 is formed can have planar surfaces on both sides and the curvature of the longitudinally-inward facing surface 124 can represent the location of the weld or the weld bead coupling the circumferential flange 118 to the rest of the main body 102.

FIGS. 3 and 4 also illustrate profiles of inner and outer surfaces of the main body 102. In particular, as an inner surface 128 of the main body 102 extends longitudinally outward toward a terminal end portion of the main body 102, it also extends radially inward toward the central longitudinal axis of the pipe fitting 100. For example, the inner surface 128 extends, from a central portion 130 of the main body 102 to a terminal end portion 132 of the main body 102, at an angle $\alpha_2$ with respect to the central longitudinal axis of the pipe fitting 100. As another example, a first portion of the outer surface 134a extends, from the central portion 130 of the main body 102 to the circumferential flange 118, at an angle $\alpha_3$ with respect to the central longitudinal axis of the pipe fitting 100. In some implementations, angle $\alpha_2$ is equal to angle $\alpha_3$, such that a wall thickness of the main body 102 is constant between the central portion 130 of the main body 102 and the circumferential flange 118. In some implementations, angle $\alpha_2$ and angle $\alpha_3$ are both 30 degrees. As further illustrated in FIG. 4, a second portion of the outer surface 134b extends, from the circumferential flange 118 to the terminal end of the main body 102, that is, across the terminal end portion 132 of the main body 102, at an angle $\alpha_1$ with respect to the central longitudinal axis of the pipe fitting 100. In some implementations, angle $\alpha_1$ is less than angle $\alpha_2$ and angle $\alpha_3$, such as by at least 5 degrees, at least 10 degrees, or at least 15 degrees, and by less than 40 degrees, less than 30 degrees, or less than 20 degrees, and such that the first portion of the outer surface 134a is oblique to the second portion of the outer surface 134b. In some implementations, angle $\alpha_1$ is 20 degrees.

FIG. 4 also illustrates that the main body 102 includes an internal gripper stop surface or lip 176, which is a longitudinally inward-facing surface at the longitudinally innermost end of the terminal end portion 132 of the main body 102. When the fitting 100 is in use, the lip 176 prevents movement of the first seal assembly 112, including a gasket 144 and grippers 146 thereof (described more fully elsewhere herein) from moving longitudinally outward beyond the longitudinal location of the circumferential flange 118. Thus, when the first seal assembly 112 reaches the end of its travel toward the terminal end portion 132 of the main body 102, the grippers 146 are directly radially inward of the circumferential flange. Depending on installation requirements, in practice, the first seal assembly 112 may not reach the end of its travel, but in general at least a portion of the grippers 146 will be directly radially inward from the circumferential flange 118. While this limits the travel of the first seal assembly 112, this can be advantageous at least because it can limit a degree to which the grippers 146 bite into the pipe 300 to which the pipe fitting 100 is being coupled. In particular, it is desirable that the grippers 146 bite into the outer surface of the pipe 300 to a degree, to restrain relative movement between the pipe 300 and the fitting 100, but without crushing or destroying the pipe 300. The limitation of the travel of the first seal assembly 112 in this manner also results in the circumferential flange 118 reinforcing a potential failure point of the fitting 100 at a location where the first seal assembly 112 sits when in use.

Figure 6:
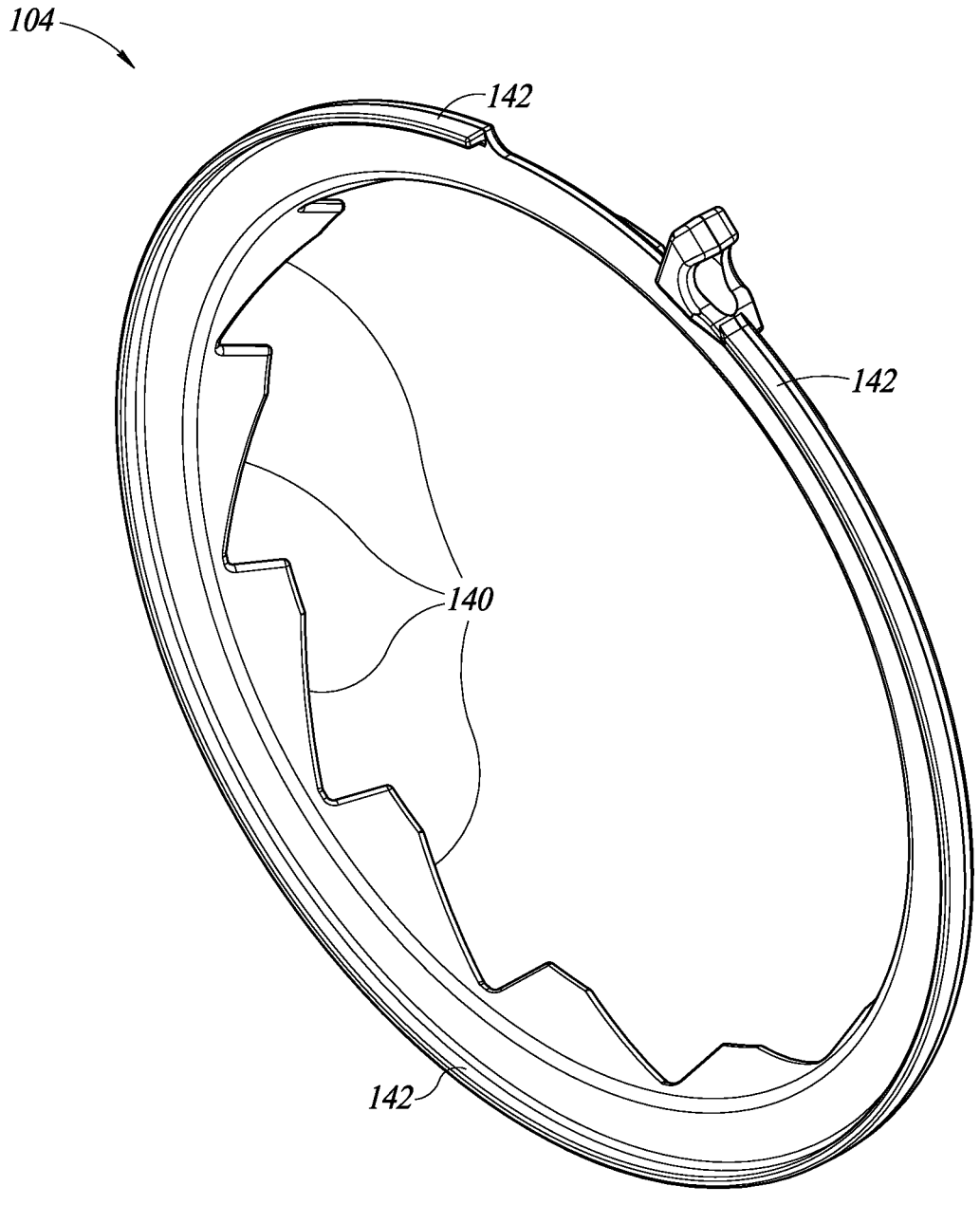
FIG. 6 illustrates another perspective view of the end ring of FIG. 5.
Figures 7, 8:
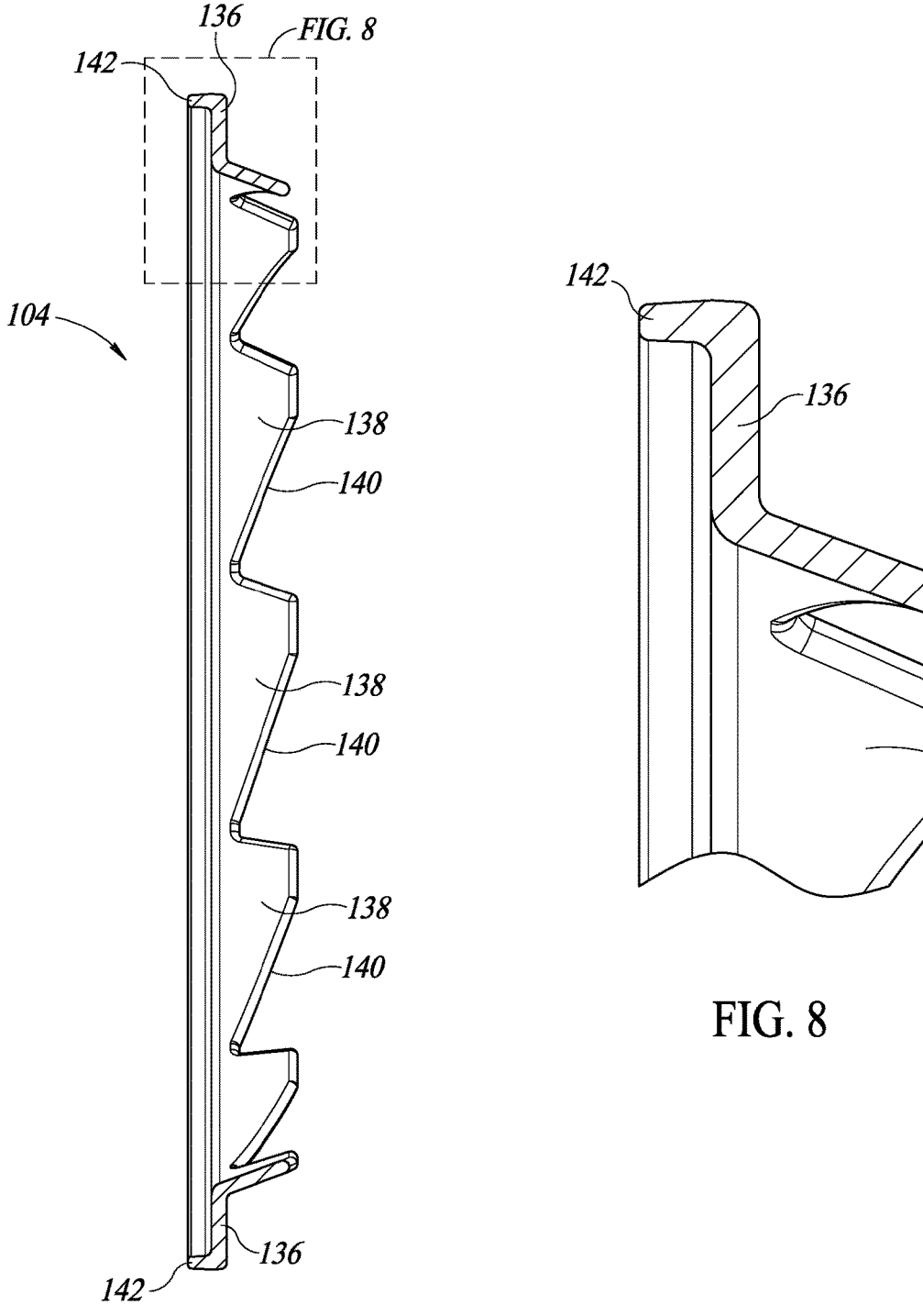
FIG. 7 illustrates a cross-sectional view of the end ring of FIG. 5 taken along line 7-7 illustrated in FIG. 5.
FIG. 8 illustrates an enlarged view of a portion of FIG. 7.

FIG. 5 illustrates a first perspective view of the first end ring 104, and FIG. 6 illustrates a second perspective view of the first end ring 104. FIG. 7 illustrates a cross-sectional view of the first end ring 104, and FIG. 8 illustrates an enlarged view of a portion of FIG. 7. As illustrated in FIGS. 5-8, the first end ring 104 includes an annular main body 136, which has an overall hollow cylindrical shape that extends continuously a full 360 degrees about the central longitudinal axis of the pipe fitting 100. The first end ring 104 also includes a plurality of angular tabs 138, each rigidly coupled to, and extending longitudinally outward and radially inward from, a first outer surface of the main body 136. Each of the angular tabs 138 includes a triangular or substantially triangular overall shape and provides a respective ramp surface 140 configured to engage other components of the pipe fitting 100, as described further elsewhere herein.

As further illustrated in FIGS. 5-8, the first end ring 104 includes a longitudinal flange 142 extending directly longitudinally outward from a second outer surface of the main body 136 opposite the first outer surface of the main body 136. In particular, the longitudinal flange 142 extends outward from a radially-outermost end portion of the main body 136. As illustrated in FIGS. 5-8, the longitudinal flange 142 extends circumferentially around almost the entirety of the annular shape or profile of the main body 136, but extends circumferentially around less than an entirety of the annular shape or profile of the main body 136. For example, the longitudinal flange 142 may extend circumferentially around more than 270 degrees, 280 degrees, 290 degrees, 300 degrees, 310 degrees, 320 degrees, 330 degrees, 340 degrees, or 350 degrees of the annular shape or profile of the main body 136. As other examples, the longitudinal flange 142 may extend circumferentially around less than 280 degrees, 290 degrees, 300 degrees, 310 degrees, 320 degrees, 330 degrees, 340 degrees, 350 degrees, or 360 degrees of the annular shape or profile of the main body 136. When the first end ring 104 is installed on and coupled to the first end of the main body 102, the angular tabs 138 extend longitudinally outward with respect to a center of the main body 102, and the longitudinal flange 142 extends longitudinally inward with respect to a center of the main body 102. The longitudinal flange 142 can facilitate the casting of the first end ring 104, such as by increasing a rigidity and/or stiffness of the first end ring 104.

Figure 9:
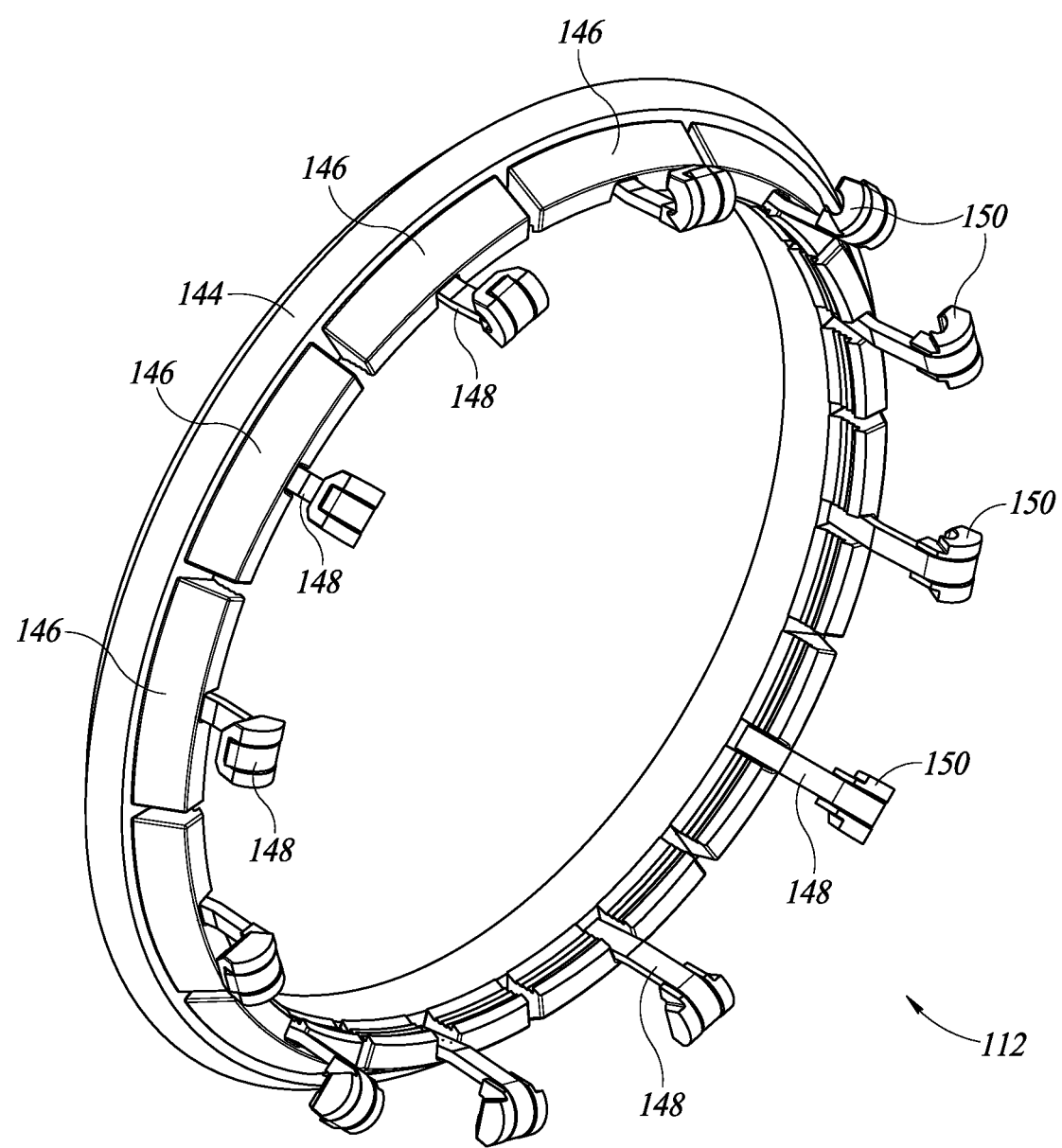
FIG. 9 illustrates a perspective view of a seal assembly of the pipe fitting of FIG. 1.
Figure 10:
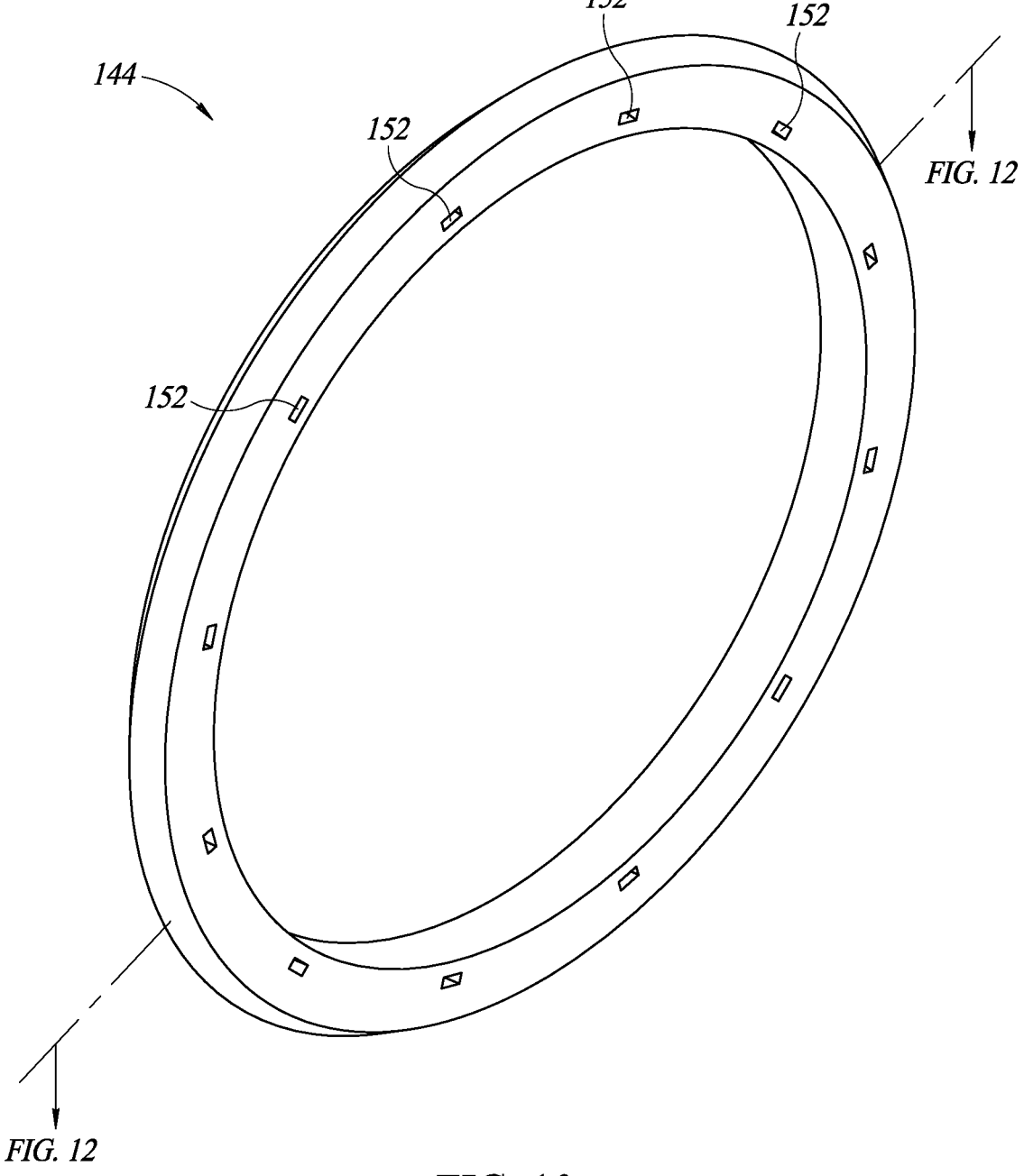
FIG. 10 illustrates a perspective view of a gasket of the seal assembly of FIG. 9.
Figure 11:
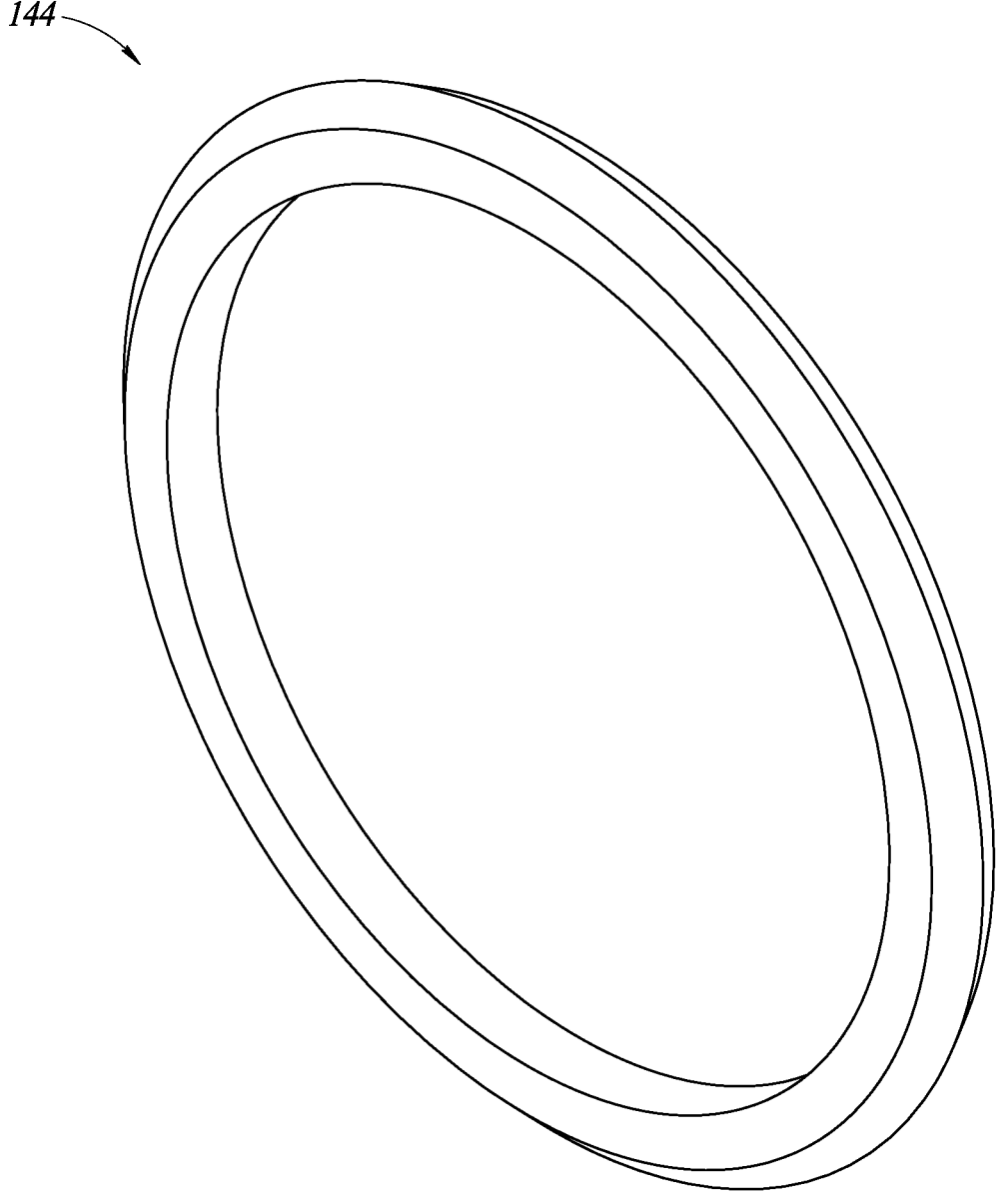
FIG. 11 illustrates another perspective view of the gasket of FIG. 10.
Figures 12, 13:
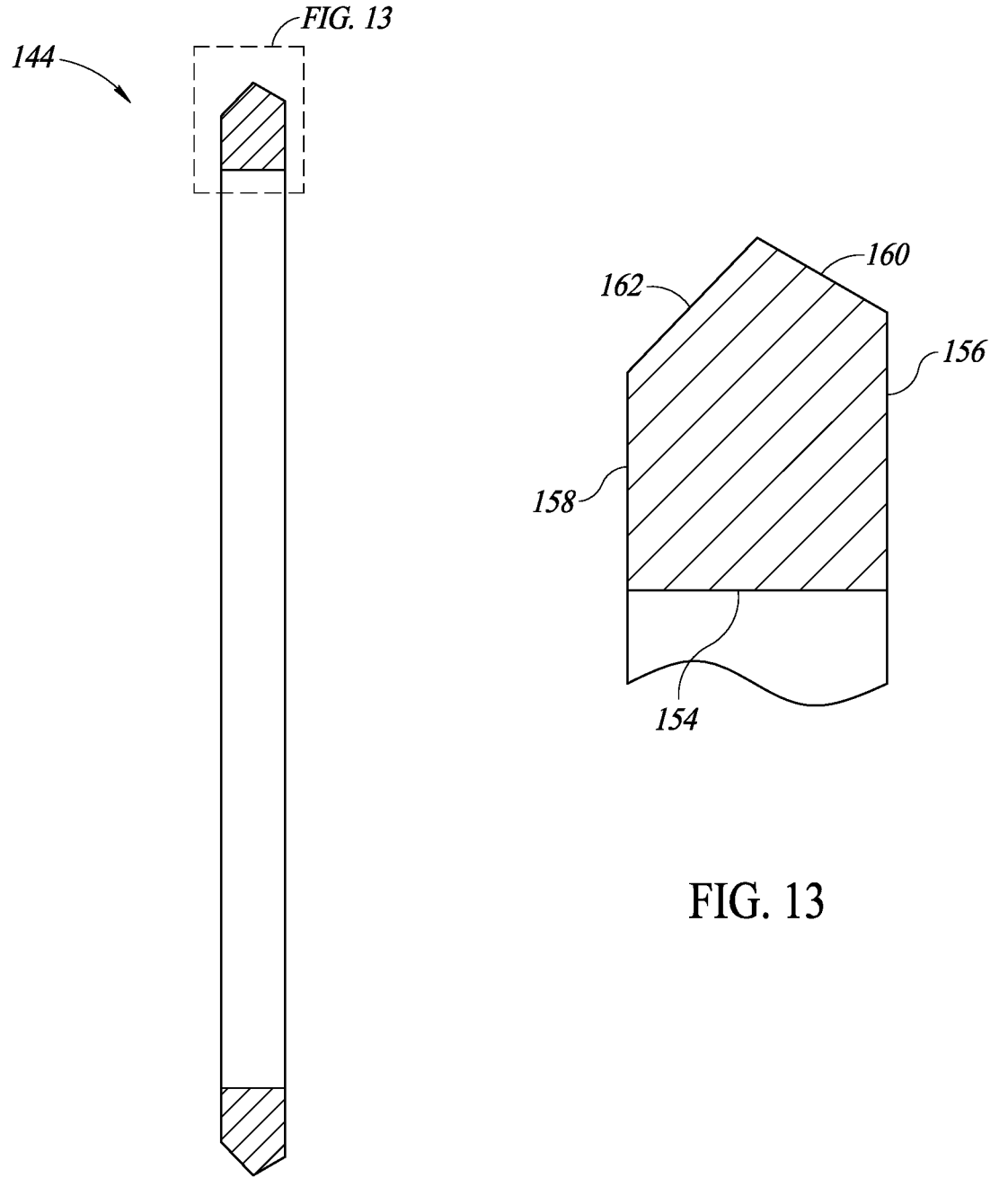
FIG. 12 illustrates a cross-sectional view of the gasket of FIG. 10 taken along line 12-12 illustrated in FIG. 10.
FIG. 13 illustrates an enlarged view of a portion of FIG. 12.

FIG. 9 illustrates a perspective view of the first seal assembly 112. As illustrated in FIG. 9, the first seal assembly 112 includes an annular gasket 144, a plurality of (e.g., twelve) grippers or teeth 146, a plurality of (e.g., twelve) draw hooks 148, and a plurality of (e.g., twelve) runner components 150. FIG. 10 illustrates a first perspective view of the gasket 144, FIG. 11 illustrates a second perspective view of the gasket 144, FIG. 12 illustrates a cross-sectional view of the gasket 144, and FIG. 13 illustrates an enlarged view of a portion of FIG. 12. As illustrated in FIGS. 10 and 11, the gasket 144 is annular and has an overall hollow cylindrical shape that extends continuously a full 360 degrees about the central longitudinal axis of the pipe fitting 100. As illustrated in FIG. 10 in particular, a longitudinally-outward facing outer surface of the gasket 144 includes a plurality of (e.g., twelve) openings 152, where each of the openings 152 is configured to receive a portion of a respective one of the draw hooks 148 so that the draw hooks 148 can be securely coupled to the gasket 144 by embedding a respective portion of each of the draw hooks 148 within the gasket 144.

The gasket 144 has a constant overall cross-sectional shape along the entirety of its length, 360 degrees about the central longitudinal axis of the pipe fitting 100. As illustrated in FIGS. 12 and 13 in particular, the gasket 144 has a cross-sectional shape that includes an irregular pentagon. A first side of the irregular pentagon, corresponding to a first side surface 154 of the gasket 144, is a radially inner-most side of the irregular pentagon that extends generally parallel to the central longitudinal axis of the pipe fitting 100. Thus, the first side surface 154 of the gasket 144 extends longitudinally but not radially with respect to the central longitudinal axis of the pipe fitting 100. A second side of the irregular pentagon, corresponding to a second side surface 156 of the gasket 144, which is the longitudinally-outward facing outer surface of the gasket 144 that includes the openings 152, is the longitudinally outer-most side of the irregular pentagon and extends generally perpendicular to the central longitudinal axis of the pipe fitting 100 and perpendicular to the first side surface 154. Thus, the second side surface 156 of the gasket 144 extends radially but not longitudinally with respect to the central longitudinal axis of the pipe fitting 100.

A third side of the irregular pentagon, corresponding to a third side surface 158 of the gasket 144, is opposite to, parallel to, and shorter than the second side surface 156, and is also a longitudinally inner-most side of the irregular pentagon, and extends generally perpendicular to the central longitudinal axis of the pipe fitting 100 and perpendicular to the first side surface 154. Thus, the third side surface 158 of the gasket 144 extends radially but not longitudinally with respect to the central longitudinal axis of the pipe fitting 100. A fourth side of the irregular pentagon, corresponding to a fourth side surface 160 of the gasket 144, extends from the second side surface 156, both radially outward and longitudinally inward with respect to the central longitudinal axis of the pipe fitting 100, to a location midway between the planes of the second side surface 156 and the third side surface 158 of the gasket 144. A fifth side of the irregular pentagon, corresponding to a fifth side surface 162 of the gasket 144, extends from the third side surface 158, both radially outward and longitudinally with respect to the central longitudinal axis of the pipe fitting 100, to meet the fourth side of the irregular pentagon at the location midway between the planes of the second side surface 156 and the third side surface 158 of the gasket 144. Thus, because the third side surface 158 is shorter than the second side surface 156, the fifth side surface 162 is longer than the fourth side surface 160.

The overall cross-sectional shape of the gasket 144 provides several advantages. First, it has been found that the cross-sectional shape of the gasket 144 improves sealing of the pipe fitting 100 to an end of a pipe 300 by using a pressure of a fluid carried by the pipe 300 to strengthen the seal. That is, when the first end of the pipe fitting 100 is coupled to and sealed to an end of a pipe 300, the first side surface 154 of the gasket 144 is in contact with and provides a seal against an exterior surface of the pipe 300. When pressurized fluid is provided to the interior of the pipe 300, the pressurized fluid exerts positive pressure against the third side surface 158 and the fifth side surface 162 of the gasket 144, thereby urging the gasket 144 further longitudinally outward, as well as, due to the angle of the fifth side surface 162, radially inward and against the exterior of the pipe 300. The specific cross-sectional shape of the gasket 144 has also been found to improve uniformity of compression of the gasket 144 when it is under pressure, and has also been found to reduce or prevent undesirable "wrinkling" of the gasket 144 when it is under pressure.

Figure 14:
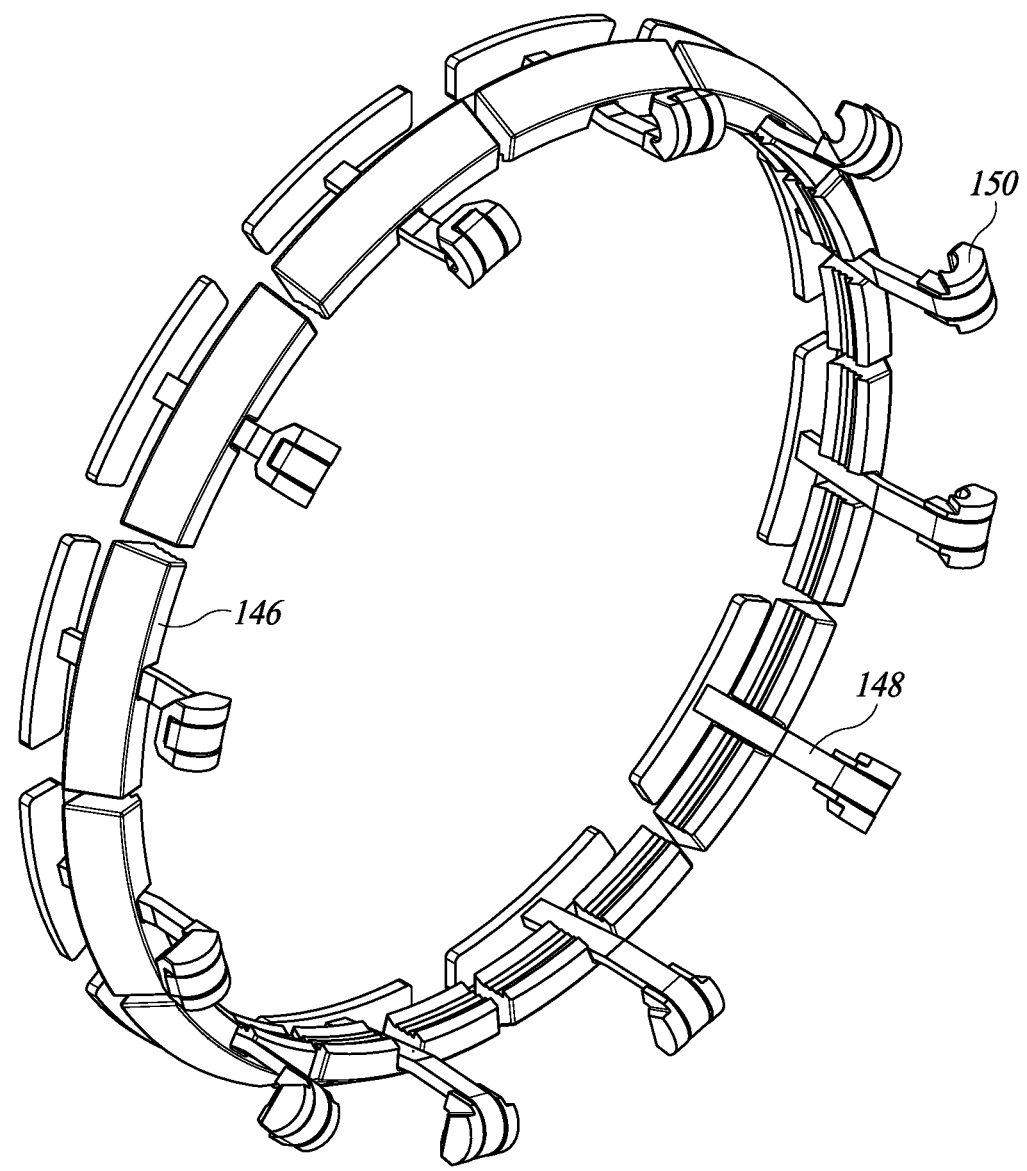
FIG. 14 illustrates a perspective view of the seal assembly of FIG. 9 without the gasket of FIGS. 10-13.
Figure 15:
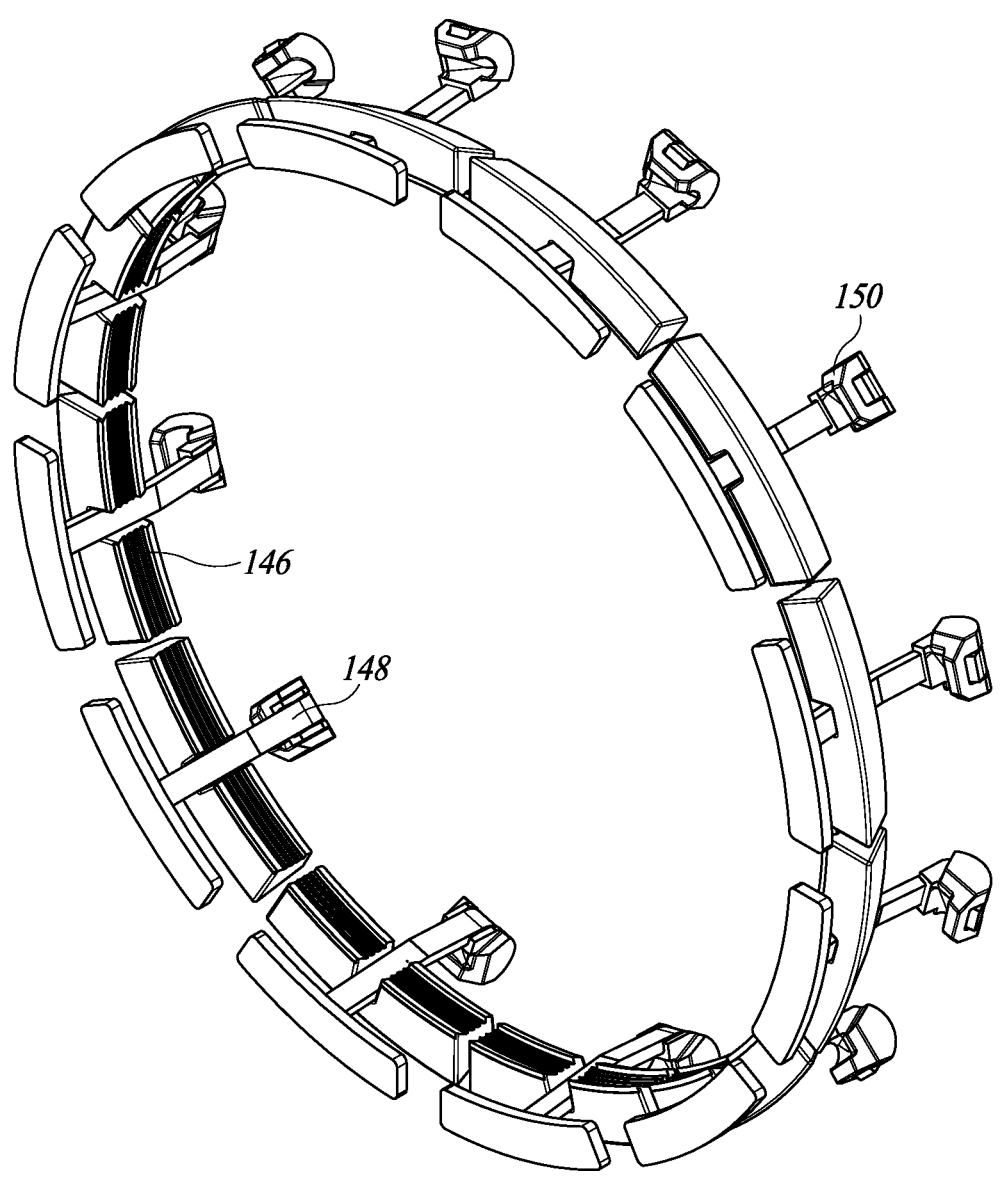
FIG. 15 illustrates another perspective view of the seal assembly of FIG. 9 without the gasket of FIGS. 10-13.
Figure 16:
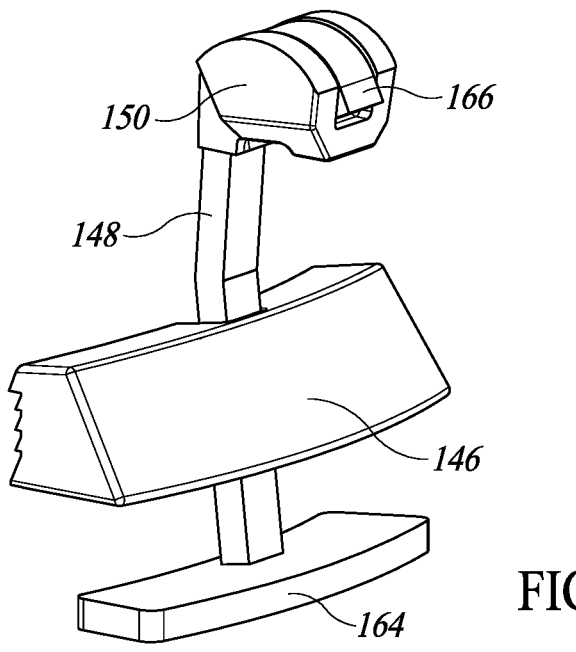
FIG. 16 illustrates a perspective view of components of the seal assembly of FIG. 9.
Figure 17:
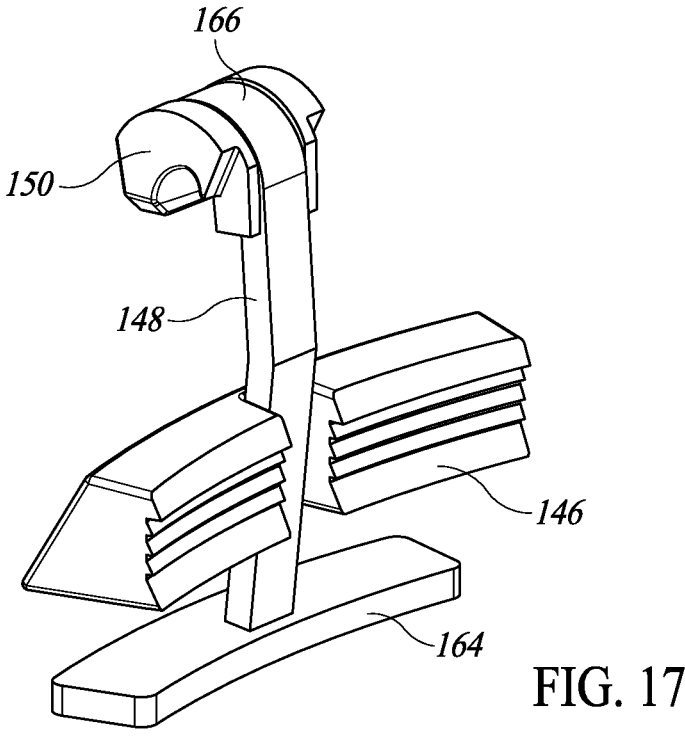
FIG. 17 illustrates another perspective view of the components of the seal assembly of FIG. 9 illustrated in FIG. 16.

FIG. 14 illustrates a first perspective view of the first seal assembly 112 without the gasket 144 and FIG. 15 illustrates a second perspective view of the first seal assembly 112 without the gasket 144. In particular, FIGS. 14 and 15 illustrate the twelve grippers 146, the twelve draw hooks 148, and the twelve runner components 150. FIG. 16 illustrates a first perspective view of one of the grippers 146, one of the draw hooks 148, and one of the runner components 150, and FIG. 17 illustrates a second perspective view of one of the grippers 146, one of the draw hooks 148, and one of the runner components 150. As illustrated in FIGS. 14-17, each of the draw hooks 148 is coupled to a respective one of the grippers 146 and a respective one of the runner components 150 to form a hook assembly, such that twelve distinct hook assemblies are formed and collectively positioned and arranged concentrically with the central longitudinal axis of the pipe fitting 100.

Each of the draw hooks 148 includes a plate base portion 164 at a first end thereof and a curved hook portion 166 at a second end thereof opposite the first end thereof. When the pipe fitting 100 is assembled, the plate base portion 164 of each of the draw hooks 148 is embedded within the gasket 144 and each of the draw hooks 148 extends from the respective plate base portion 164 out of the gasket 144 through a respective one of the openings 152. Each of the grippers 146 is mounted on the respective one of the draw hooks 148 and adjacent to the gasket 144 such that the grippers 146 are confined to move together with the draw hooks 148 and the gasket 144. Each of the grippers 146 has a set of teeth facing in a direction opposite to the curved hook portion 166 of the respective one of the draw hooks 148, where the teeth are configured to bite into and engage with an outer surface of an end of a pipe 300 to which the pipe fitting 100 is secured. Each of the runner components 150 is mounted on an inner side of the curved hook portion 166 of the respective one of the draw hooks 148, such as to allow the curved hook portion 166 of the respective one of the draw hooks 148 to slide more efficiently (e.g., with less friction) along another surface, such as a ramp surface 140 of a respective one of the angular tabs 138.

Figure 18:
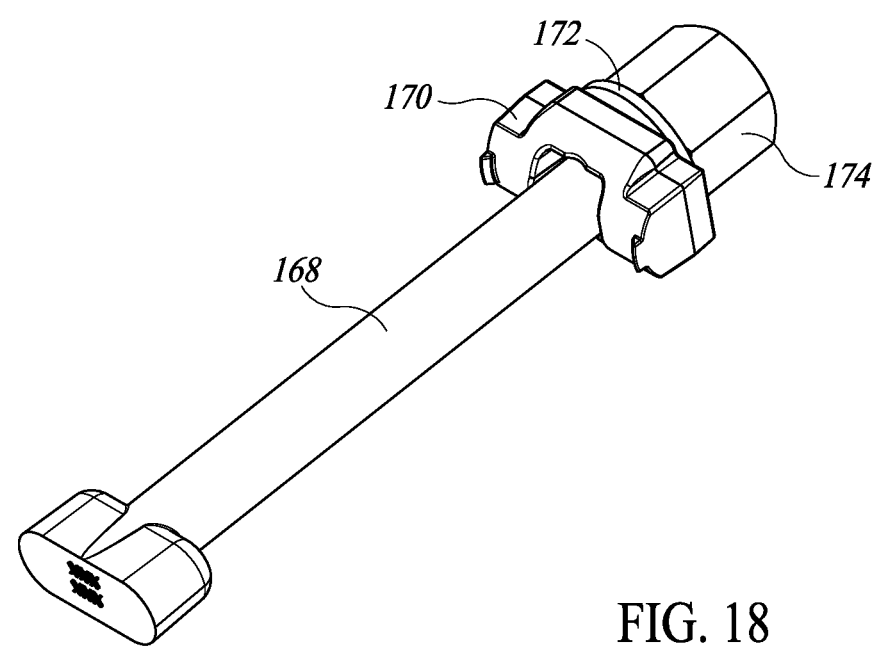
FIG. 18 illustrates a perspective view of a bolt assembly of the pipe fitting of FIG. 1.
Figure 19:
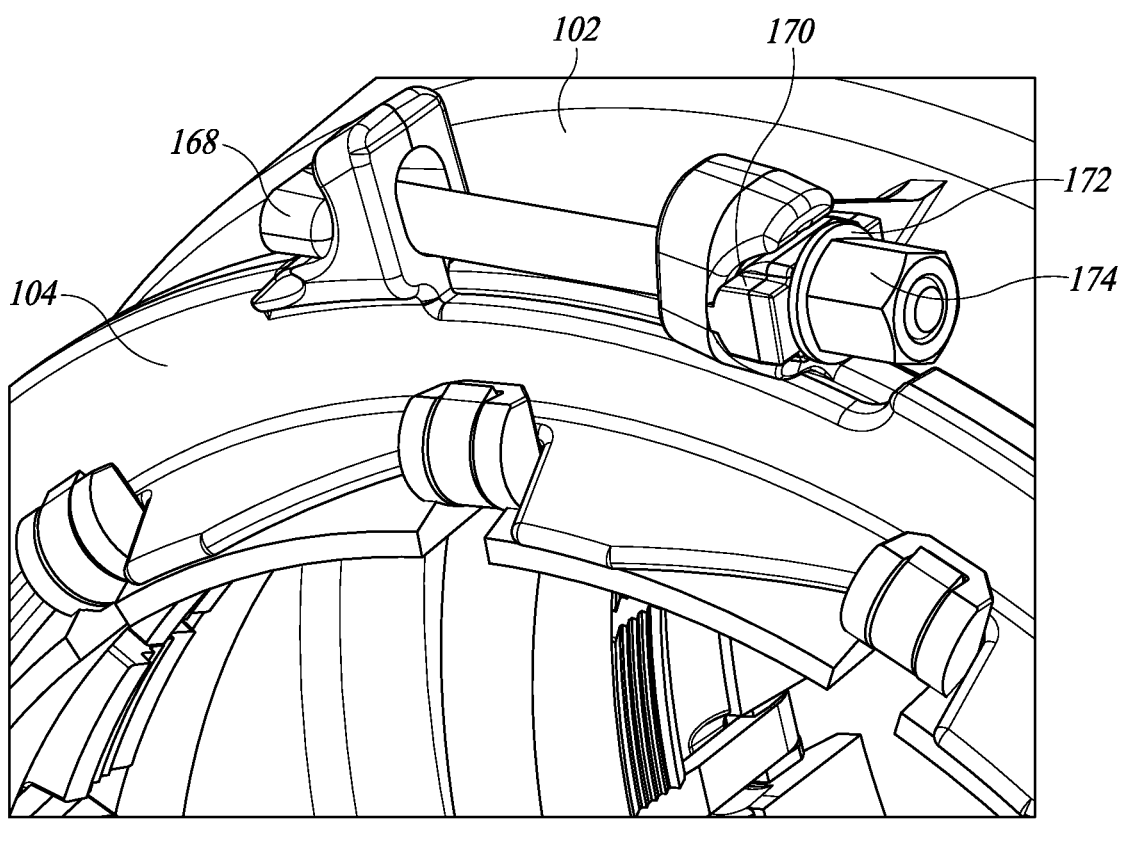
FIG. 19 illustrates an enlarged perspective view of a portion of the pipe fitting of FIG. 1 including the bolt assembly of FIG. 18.

FIG. 18 illustrates the first bolt assembly 108 of the pipe fitting 100 and FIG. 19 illustrates the first bolt assembly 108 coupled to the first end of the main body 102 of the pipe fitting 100 and to the first end ring 104. As illustrated in FIGS. 18 and 19, the first bolt assembly 108 includes a bolt 168 having a flanged head at a first end thereof and threads at a second end thereof opposite the first end thereof. The first bolt assembly 108 further includes a bolt guide 170, a washer 172, and a threaded nut 174 that is configured to be threaded onto and off of the threads at the second end of the bolt 168. FIG. 19 also illustrates an enlarged perspective view of several components described herein and the ways in which such components are coupled to one another. For example, FIG. 19 illustrates that the first end ring 104 is coupled to the main body 102 such that the second outer surface of the main body 136 of the first end ring 104 faces toward, and is adjacent to, the longitudinally-outward facing surface 122 of the circumferential flange 118 of the main body 102, such that the longitudinal flange 142 of the first end ring 104 extends over, faces, and is adjacent to, the radially-outermost end surface 126 of the circumferential flange 118 of the main body 102, and such that inner surfaces of the angular tabs 138 extend over, face, and are adjacent to, the second portion of the outer surface 134*b* and the terminal end portion 132 of the main body 102. Such engagement of the first end ring 104 with the first circumferential flange 118 of the main body ensures that the first end ring 104 remains concentric or substantially concentric with the main body 102.

FIG. 19 further illustrates that the first bolt assembly 108 is coupled to the first end of the main body 102 and to the first end ring 104 such that, as the threaded nut 174 is tightened on the bolt 168, the first end ring 104 is forced to rotate clockwise with respect to the main body 102, and such that, when the threaded nut 174 is loosened on the bolt 168, the first end ring 104 is allowed to rotate counter-clockwise with respect to the main body 102. FIG. 19 further illustrates that each of the draw hooks 148 extends from the gasket 144, which is positioned inside the main body 102, through a respective one of the slots 116 formed in the terminal end portion 132 of the main body 102, to an exterior of the main body 102, such that the draw hooks 148 are restrained against rotation with respect to the main body 102 by their engagement with the surfaces of the main body defining the edges of the slots 116. FIG. 19 further illustrates that a curved hook portion 166 of each of the draw hooks 148 and a respective one of the runner components 150 are engaged with a ramp surface 140 of a respective one of the angular tabs 138.

Thus, clockwise rotation of the first end ring 104 with respect to the main body 102 forces the draw hooks 148 to move longitudinally outward with respect to the main body 102 due to the engagement of the curved hook portions 166 of the draw hooks 148 and of the respective runner components 150 with the ramp surfaces 140 of the angular tabs 138 of the first end ring 104 and the restraint of the draw hooks 148 against rotation. That is, clockwise rotation of the first end ring 104 with respect to the main body 102 forces the draw hooks 148 to ride up the ramp surfaces 140 of the angular tabs 138 of the first end ring 104. Similarly, counter-clockwise rotation of the first end ring 104 with respect to the main body 102 allows the draw hooks 148 to move longitudinally inward with respect to the main body 102. That is, counter-clockwise rotation of the first end ring 104 with respect to the main body 102 allows the draw hooks 148 to ride down the ramp surfaces 140 of the angular tabs 138 of the first end ring 104.

Figure 20:
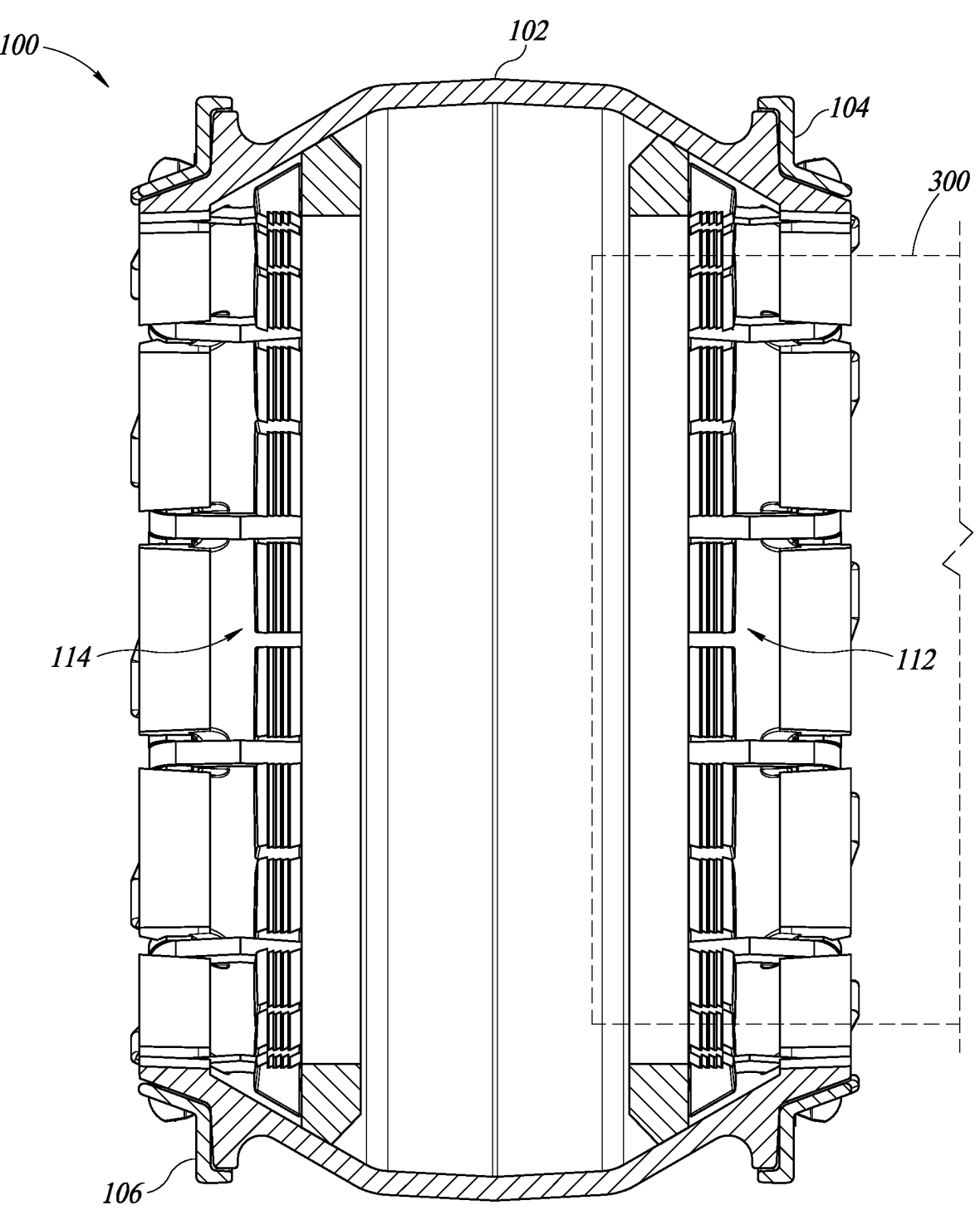
FIG. 20 illustrates a cross-sectional view of the pipe fitting of FIG. 1 taken along line 20-20 illustrated in FIG. 1.
Figure 21:
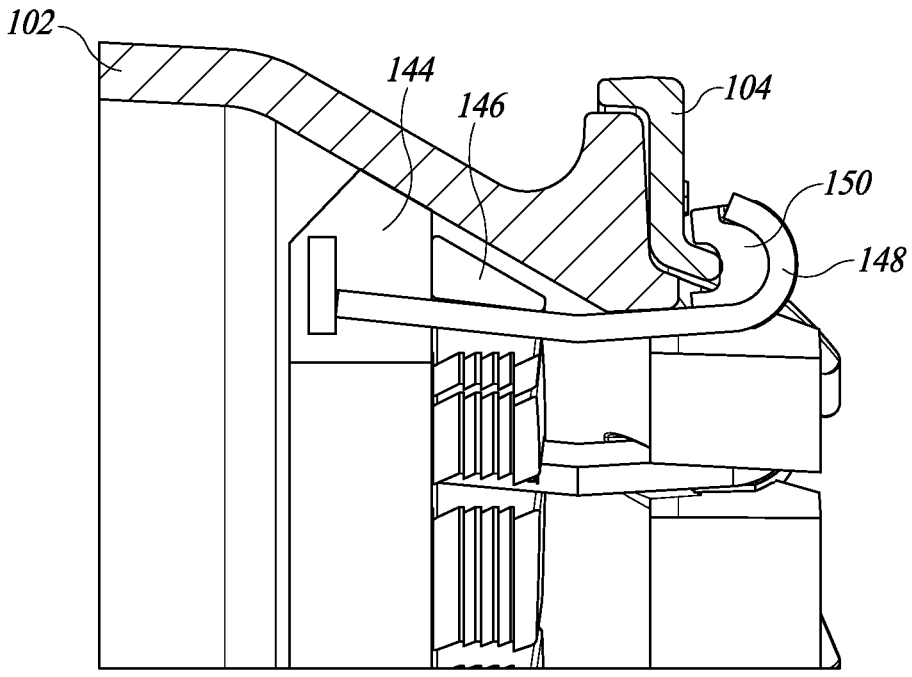
FIG. 21 illustrates a cross-sectional view of a portion of the pipe fitting of FIG. 1 in a disengaged configuration.
Figure 22:
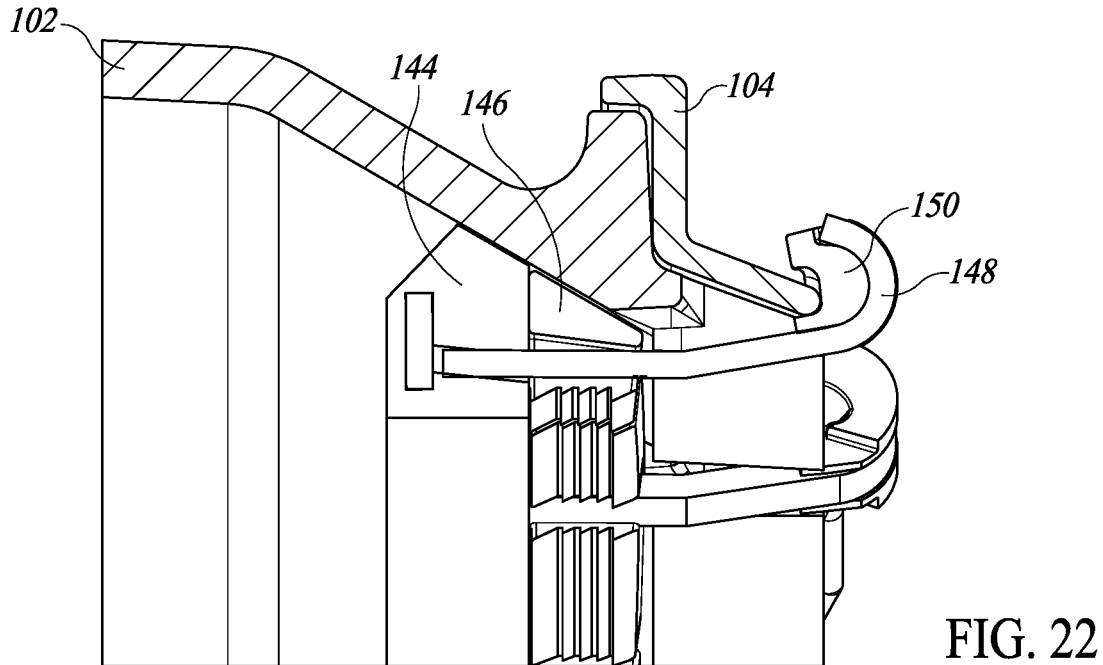
FIG. 22 illustrates a cross-sectional view of a portion of the pipe fitting of FIG. 1 in an engaged configuration.

FIG. 20 illustrates a cross-sectional view of the pipe fitting 100, and FIG. 21 illustrates a cross-sectional view of a portion of the pipe fitting 100 in a disengaged configuration which results when the first bolt assembly 108 is loosened. As illustrated in FIG. 21, the first seal assembly 112 is positioned such that the fourth side surface 160 of the gasket 144 is engaged with and abuts against the inner surface 128 of the main body 102. FIG. 22 illustrates a cross-sectional view of a portion of the pipe fitting 100 in an engaged configuration which results when the first bolt assembly 108 is tightened. As illustrated in FIGS. 21 and 22, as the first bolt assembly 108 is tightened, the first end ring 104 is forced to rotate with respect to the main body 102 and the draw hooks 148 are thereby forced to move longitudinally outward with respect to the main body 102. Such movement of the draw hooks 148 pulls the gasket 144 and the grippers 146 longitudinally outward with respect to the main body 102. Further, because the inner surface 128 of the main body 102 is angled radially inward, such movement and engagement between the gasket 144 and the grippers 146 also forces the gasket 144 and the grippers 146 to move radially inward toward the central longitudinal axis of the pipe fitting 100, eventually closing and sealing the pipe fitting 100 against an outer surface of a pipe 300 to which the pipe fitting 100 is being coupled.

FIGS. 21 and 22 also illustrate that, due to the difference in the angles $\alpha_1$ and $\alpha_2$, the draw hooks 148 rotate with respect to the hollow main body 102 as they are pulled and move longitudinally outward with respect to the hollow main body 102. In particular, because angle $\alpha_2$ is steeper with respect to the central longitudinal axis of the hollow main body 102 than the angle $\alpha_1$, for the same or substantially the same longitudinal travel of the curved hook portion 166 and the plate base portion 164 of one of the hooks 148, the plate base portion 164 travels further radially inward toward the central longitudinal axis of the hollow main body 102. As a result, for a given longitudinal range of the curved hook portions 166 of the hooks 148, the radial range of the plate base portions 164 of the hooks 148, and of the gasket 144 and the grippers 146, increases as angle $\alpha_2$ increases relative to angle $\alpha_1$, and decreases as angle $\alpha_2$ decreases relative to angle $\alpha_1$. This can be advantageous because increased radial range of the gasket 144 and the grippers 146 increases the range of pipe diameters the fitting 100 is able to accommodate.

As also illustrated in FIGS. 21 and 22, as the first bolt assembly 108 is loosened, the first end ring 104 is allowed to rotate with respect to the main body 102 and the draw hooks 148 are thereby allowed to move longitudinally inward with respect to the main body 102. Such movement of the draw hooks 148 allows the gasket 144 and the grippers 146 to move longitudinally inward with respect to the main body 102. Further, because the inner surface 128 of the main body 102 is angled radially inward, such movement also allows the gasket 144 and the grippers 146 to move radially outward away from the central longitudinal axis of the pipe fitting 100, eventually opening and releasing a seal between the pipe fitting 100 and the outer surface of the pipe 300 to which the pipe fitting 100 was coupled.

Figure 23:
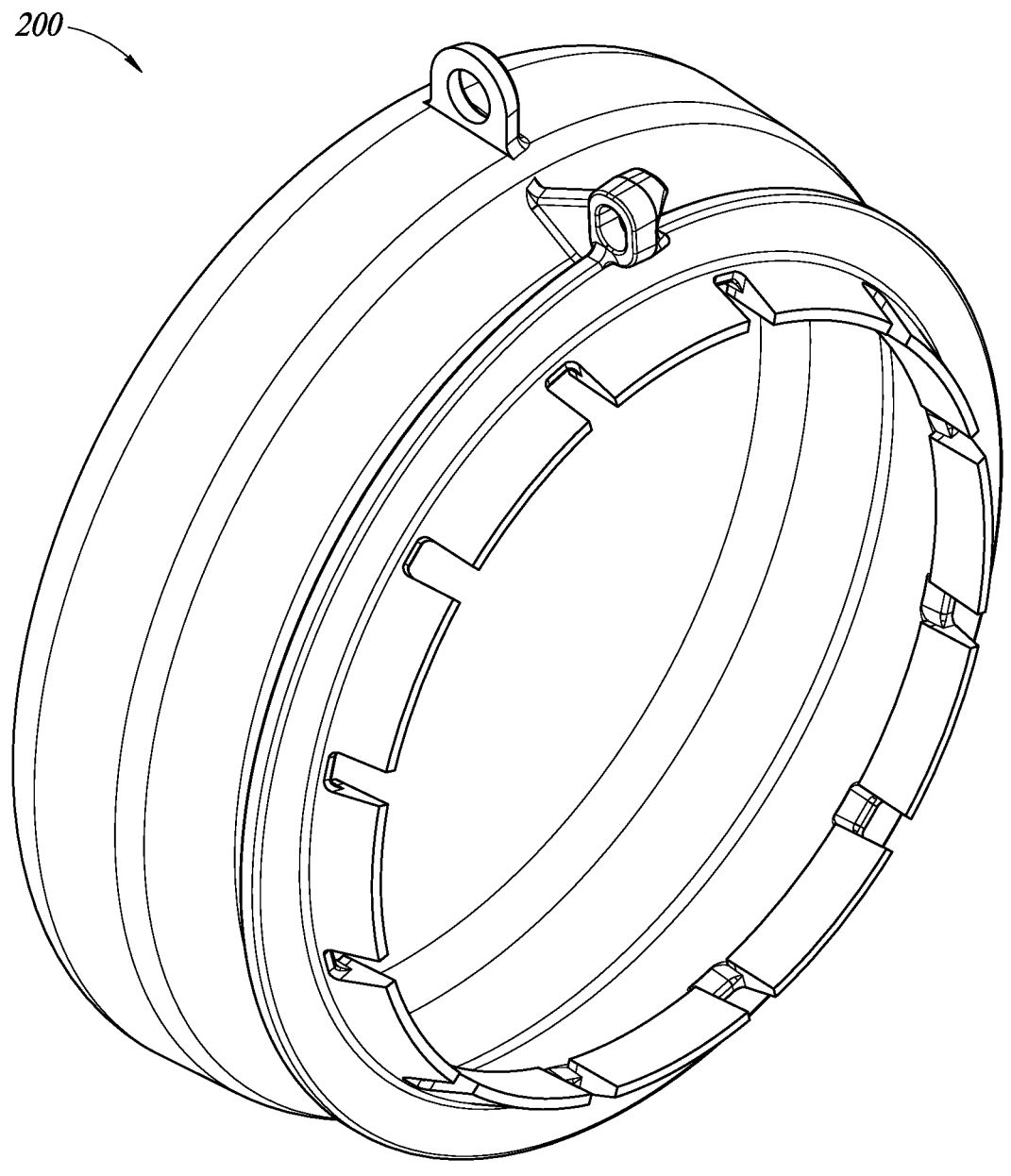
FIG. 23 illustrates a perspective view of an end cap of another pipe fitting.

FIGS. 1-22 illustrate various features of a pipe fitting 100 configured to couple an end of a first pipe to an end of a second pipe. For example, the end of the first pipe can be coupled to the first end of the pipe fitting 100 and the end of the second pipe can be coupled to the second end of the pipe fitting 100. Thus, the pipe fitting 100 can be referred to as a pipe coupling 100. FIG. 23 illustrates another embodiment including a pipe end cap 200 configured to cap or seal off an end of a pipe. The pipe end cap 200 can be used in combination with any of the features described herein for the pipe coupling 100, including the first end ring 104, the first bolt assembly 108, and the first seal assembly 112, and can function in any of the ways described herein for the pipe coupling 100. In one sense, an embodiment may include various features of the pipe coupling 100 with the pipe end cap 200 in place of the main body 102. A first end of the pipe end cap 200 may include any of the features described herein for the first end of the main body 102, and a second end of the pipe end cap 200 may include a cap or a solid wall configured to cap an end of a pipe.

The waterworks, oil, gas, and chemical industries generally employ pipes or other hollow bodies to transport water and other fluids. Fittings are structural elements that are typically employed to mechanically couple individual pipes or other hollow bodies to other system components. For example, a fitting can act as a connection component in conjunction with a valve, a hydrant, or a flange end, such as a flared flange end. In addition, some pipes include an integrated fitting type structure on one end to facilitate coupling. Fittings are installed in both above-ground and below-ground applications. For example, they can be used in manufacturing plants for a variety of applications, including on conduits, such as electrical conduits, or on heating, ventilation, and air conditioning applications. The materials used for pipes or other hollow bodies, such as conduits, can vary depending on the application. As such, particular fittings have been developed for use with particular materials, such as steel, cast iron, cement, plastic, and other kinds of materials. The pipe fitting 100 can be used in any of these applications.

In general, the pipe fitting 100 includes a generally cylindrical and tubular body or barrel sleeve, where each end of the sleeve includes an opening into which a pipe can be inserted. The barrel sleeve thus provides a hollow body that provides a fluid passageway that connects the ends of two pipes together. However, the features described herein are also applicable to other fittings that include hollow bodies, such as a "T" coupling, a 45 degree or other angle "elbow" coupling, or a single-end coupling. In the case of a "T" coupling, any one, any two (that is, exactly two, and not all three) or all three of the ends of the "T" coupling can include the features described herein for the first end of the pipe fitting 100. In other embodiments, the pipe fitting 100 can be used as a connection component in combination with a valve, a hydrant, or a flange end, such as a flared flange end, all of which include hollow bodies. Pipes may also be configured so that one or both ends include the fitting features described herein. For example, a pipe can include an integrated fitting structure on one or both ends to facilitate coupling to other components.

The fittings described herein can achieve both sealing and restraint over a wide range of pipe sizes, including sizes ranging from Iron Pipe Size (IPS) to Ductile Iron (DI) and beyond. In one specific embodiment, the pipe fitting 100 is configured to engage the outer surface of a pipe having a diameter (either inside diameter or outside diameter) of 16 inches. Further, because the draw hooks 148 and the hook assemblies of which they are a part can move independently of one another, they are capable of engaging a variety of pipe sizes and shapes, regardless of whether they are perfectly circular or have a degree of eccentricity.

While there are different ways of manufacturing the components described herein, many of the components described herein, such as the main body 102, the first end ring 104, and the second end ring 106, can be cast. Gasket 144 can be made of a conventional rubber material. The grippers 146 and draw hooks 148 can be fabricated from a variety of materials, such as steel, stainless steel, or ductile iron.

U.S. provisional patent application No. 63/242,336, filed Sep. 9, 2021, to which this application claims priority, is hereby incorporated herein by reference, in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fitting, comprising:
a hollow main body including a flange that extends radially outward with respect to a central longitudinal axis of the hollow main body and that extends circumferentially around the central longitudinal axis of the hollow main body;

a seal assembly positioned on an interior surface of the hollow main body; and
an actuation mechanism coupled to the seal assembly such that actuation of the actuation mechanism draws the seal assembly axially with respect to the central longitudinal axis of the hollow main body and radially inward with respect to the central longitudinal axis of the hollow main body, thereby forcing the seal assembly into a sealing configuration;
wherein the interior surface of the hollow main body includes a lip that prevents movement of the seal assembly longitudinally outward along the central longitudinal axis of the hollow main body beyond a longitudinal location of the flange along the central longitudinal axis of the hollow main body.

2. The fitting of claim 1 wherein, when the seal assembly reaches the end of its travel toward a terminal end portion of the hollow main body, at least a portion of the seal assembly is directly radially inward of the flange.

3. The fitting of claim 1 wherein the lip is segmented and is a longitudinally inward-facing surface.

4. The fitting of claim 1 wherein the hollow main body is a pipe coupling, a pipe endcap, a flanged coupling adapter, an elbow, a tee, a valve, or a hydrant.

5. A fitting, comprising:
a hollow main body having a distal end;
a gasket positioned on an interior surface of the hollow main body, the gasket having a length aligned with a central longitudinal axis of the hollow main body and a cross-sectional shape configured such that the gasket engages with the interior surface of the hollow main body along a distance less than the length of the gasket, wherein the cross-sectional shape of the gasket includes:
a first, radially inner-most side that extends parallel to the central longitudinal axis of the hollow main body;
a second, longitudinally-outward facing side that extends perpendicular to the first side;
a third, longitudinally-inward facing side that extends perpendicular to the first side;
a fourth side that extends from the second side to a location midway between a plane of the second side and a plane of the third side, wherein a first angle between the fourth side and the second side is greater than ninety degrees; and
a fifth side that extends from the third side to meet the fourth side at the location midway between the plane of the second side and the plane of the third side, wherein a second angle between the fifth side and the third side is greater than ninety degrees; and
an actuation mechanism coupled to the gasket such that actuation of the actuation mechanism draws the gasket axially toward the distal end of the hollow main body with respect to the central longitudinal axis of the hollow main body and radially inward with respect to the central longitudinal axis of the hollow main body, thereby forcing the gasket into a sealing configuration.

6. The fitting of claim 5 wherein the cross-sectional shape of the gasket is configured such that the gasket engages with the interior surface of the hollow main body along half the length of the gasket.

7. The fitting of claim 5 wherein the cross-sectional shape of the gasket is configured such that a longitudinally-outermost portion of the gasket engages with the interior surface of the hollow main body and a longitudinally-innermost portion of the gasket does not engage with the interior surface of the hollow main body.

8. The fitting of claim 5 wherein the gasket engages with the interior surface of the hollow main body along a partial portion of its radially-outermost surfaces.

9. The fitting of claim 5 wherein the gasket engages with the interior surface of the hollow main body along less than a length of a radial projection of the gasket onto the interior surface of the hollow main body.

10. The fitting of claim 5 wherein the third side is shorter than the second side and the fifth side is longer than the fourth side.

11. The fitting of claim 5 wherein the gasket has a radially-innermost and radially-inward facing surface and ribs on the radially-inward facing surface.

12. The fitting of claim 5 wherein the hollow main body is a pipe coupling, a pipe endcap, a flanged coupling adapter, an elbow, a tee, a valve, or a hydrant.

13. A fitting, comprising:

a hollow main body having a distal end, the distal end including a flange;

a seal positioned on an interior surface of the hollow main body; and an actuation mechanism coupled to an exterior surface of the hollow main body, wherein the exterior surface of the hollow main body extends from a distal side of the flange and at an oblique angle with respect to the interior surface and to the flange;

wherein actuation of the actuation mechanism draws the seal axially toward the distal end of the hollow main body with respect to the central longitudinal axis of the hollow main body and radially inward with respect to the central longitudinal axis of the hollow main body, thereby forcing the seal into a sealing configuration.

14. The fitting of claim 13 wherein the oblique angle is at least 5 degrees.

15. The fitting of claim 13 wherein the oblique angle is less than 40 degrees.

16. The fitting of claim 13 wherein the hollow main body is a pipe coupling, a pipe endcap, a flanged coupling adapter, an elbow, a tee, a valve, or a hydrant.

17. The fitting of claim 13 wherein the actuation mechanism includes a plurality of hooks and actuation of the actuation mechanism causes the hooks to rotate with respect to the hollow main body.

* * * * *